United States Patent [19]
Furuta et al.

[11] Patent Number: 5,349,646
[45] Date of Patent: Sep. 20, 1994

[54] SIGNAL PROCESSING APPARATUS HAVING AT LEAST ONE NEURAL NETWORK

[75] Inventors: Toshiyuki Furuta; Takashi Kitaguchi; Hirotoshi Eguchi, all of Yokohama, Japan

[73] Assignee: Ricoh Company, Ltd., Tokyo, Japan

[21] Appl. No.: 93,618

[22] Filed: Jul. 20, 1993

Related U.S. Application Data

[63] Continuation of Ser. No. 826,906, Jan. 24, 1992, Pat. No. 5,259,064.

[30] Foreign Application Priority Data

Jan. 25, 1991 [JP] Japan .................................. 3-25518
Jan. 30, 1991 [JP] Japan .................................. 3-29243
Jan. 30, 1991 [JP] Japan .................................. 3-29341

[51] Int. Cl.$^5$ .............................................. G06F 15/18
[52] U.S. Cl. ........................................ 395/22; 395/23; 395/27

[58] Field of Search .................... 395/22, 23, 24, 27

[56] References Cited

U.S. PATENT DOCUMENTS 5,167,006 11/1992 Furuta et al. ........................ 395/27

*Primary Examiner*—Allen R. MacDonald
*Assistant Examiner*—Tariq Hafiz
*Attorney, Agent, or Firm*—Oblon, Spivak, McClelland, Maier & Neustadt

[57] ABSTRACT

A signal processing apparatus for controlling an object includes an input unit, a neural network, an output unit, a teaching unit, and an error signal generator for generating a teaching signal that makes the neural network learn in real time. An error signal generator generates an error signal from the teaching signal and information contained in the network output signal. The error signal controls the neural network so that the control output signal has correct control information with respect to the output signal from the controlled object.

9 Claims, 37 Drawing Sheets

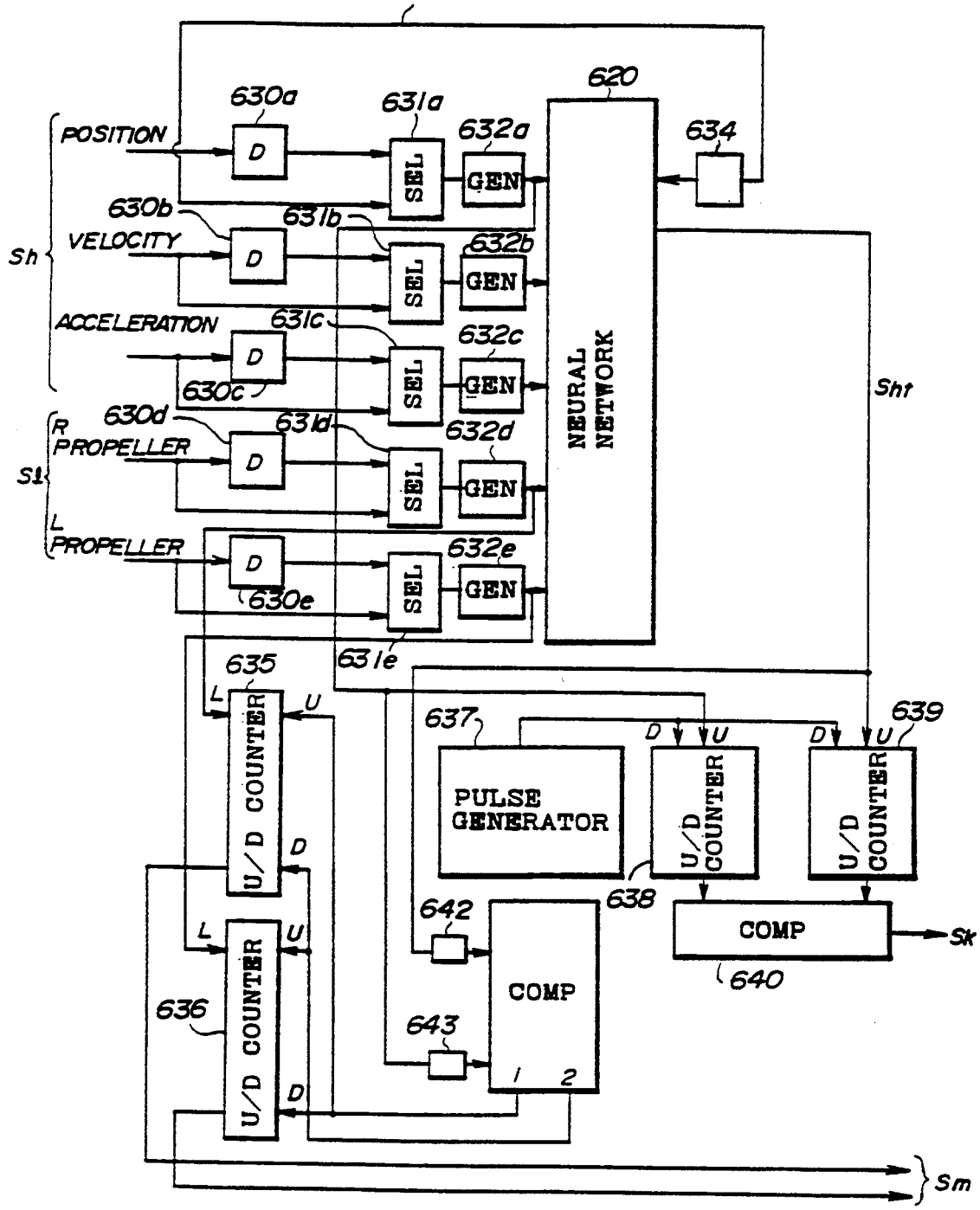

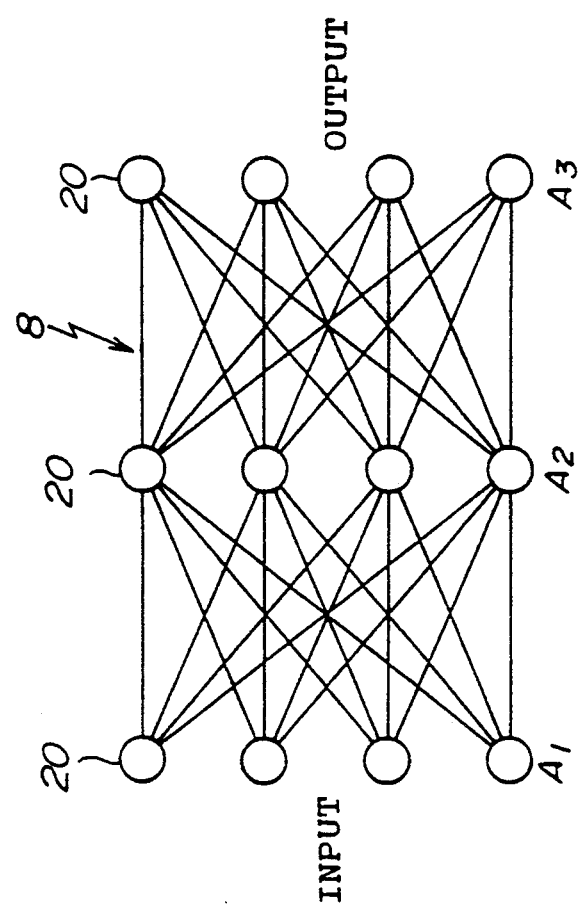

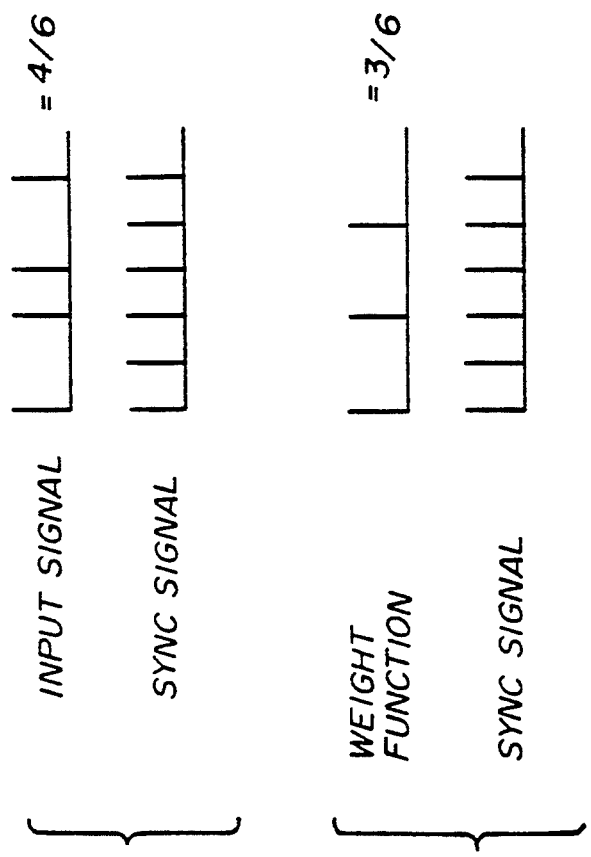

$$\delta^+{}_1 \cap T_{j1} \equiv E^+{}_{j1}$$

$$\delta^+{}_n \cap T_{jn} \equiv E^+{}_{jn}$$

$$\bigcup_{k=1}^{n}(\delta^+{}_k \cap T_{jk}) \equiv \delta_j (= \bigcup_{k=1}^{n} E^+{}_{jk})$$

FIG. 22

$$\delta^-{}_1 \cap T_{j1} \equiv E^-{}_{j1}$$

$$\delta^-{}_n \cap T_{jn} \equiv E^-{}_{jn}$$

$$\bigcup_{k=1}^{n}(\delta^-{}_k \cap T_{jk}) \equiv \delta^-{}_j (= \bigcup_{k=1}^{n} E^-{}_{jk})$$

FIG. 23

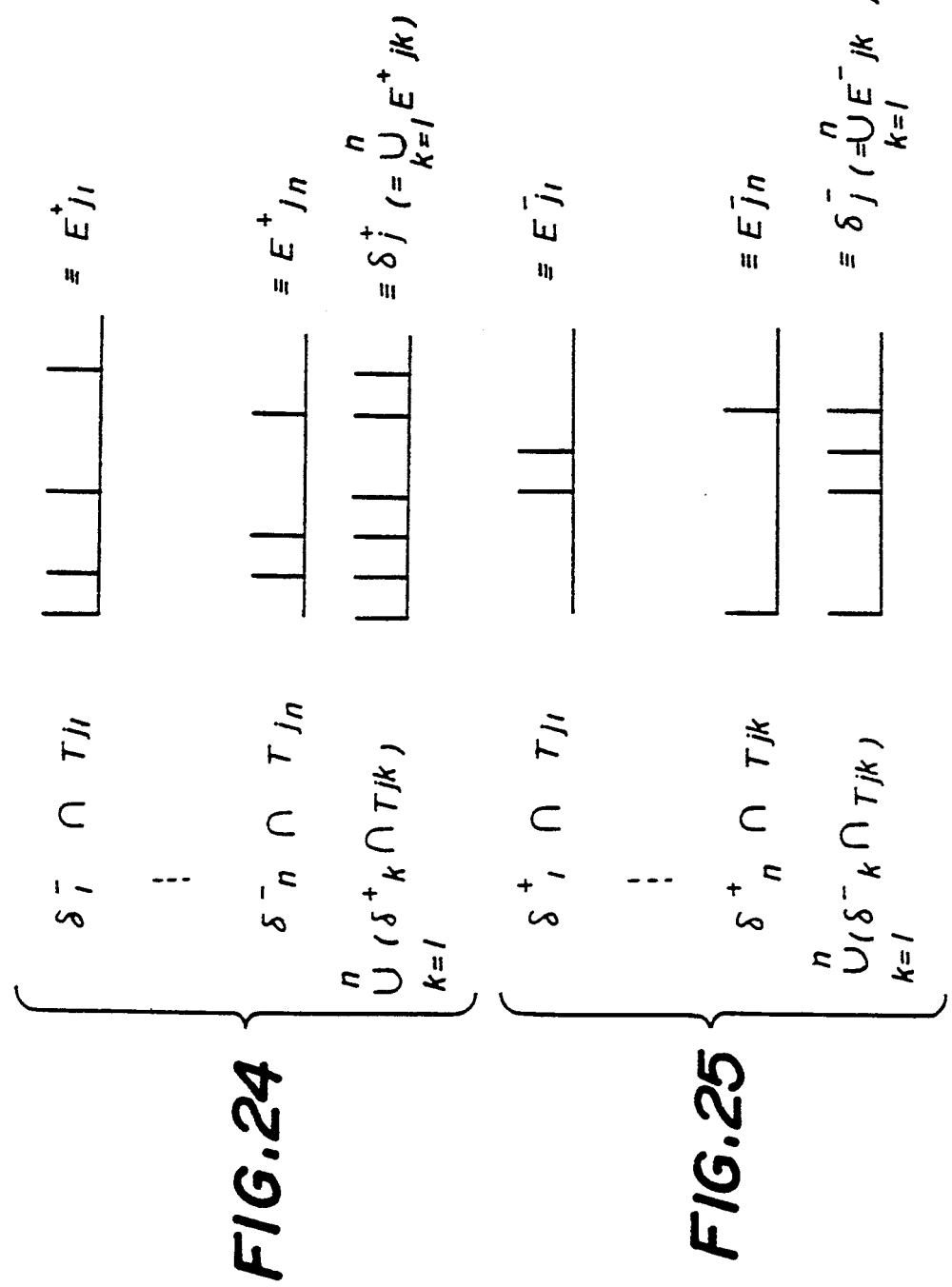

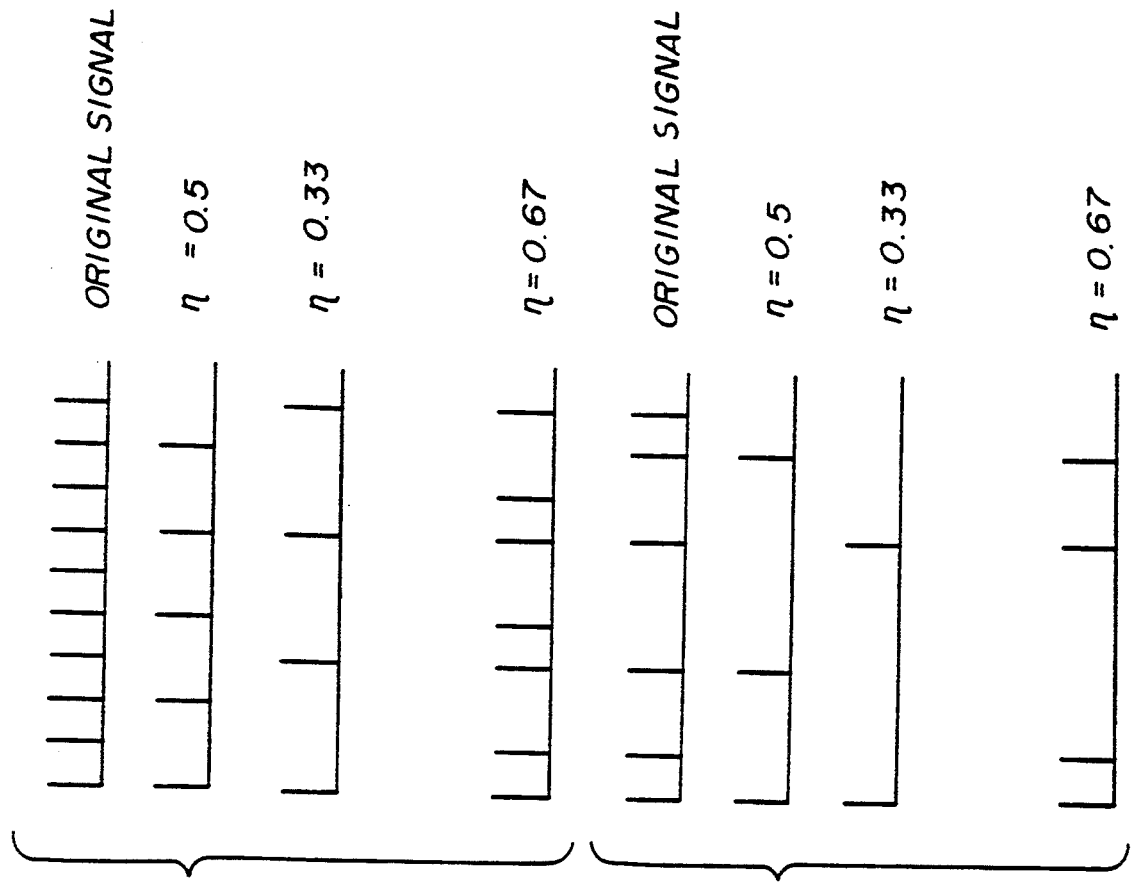

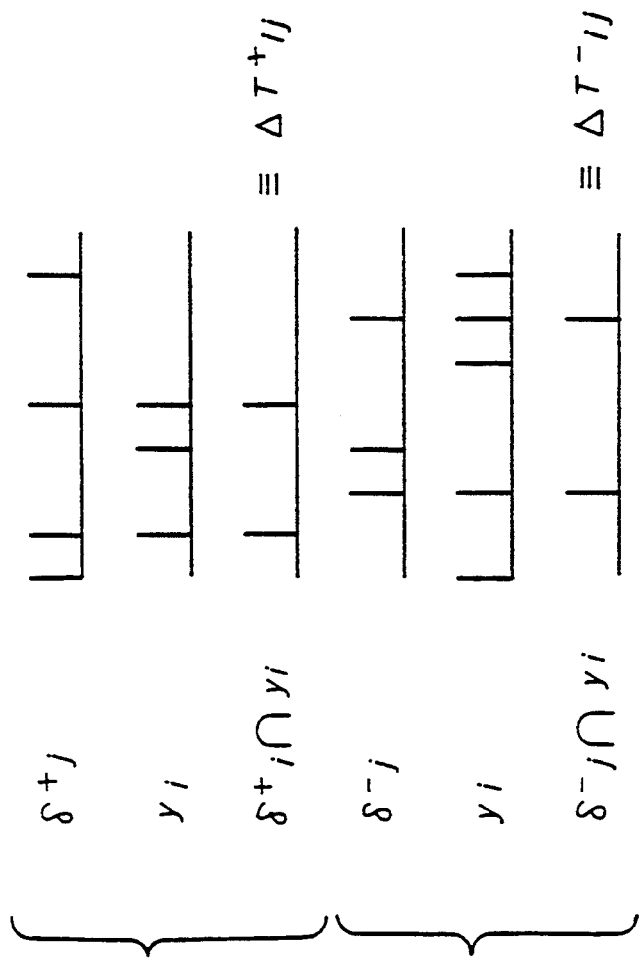

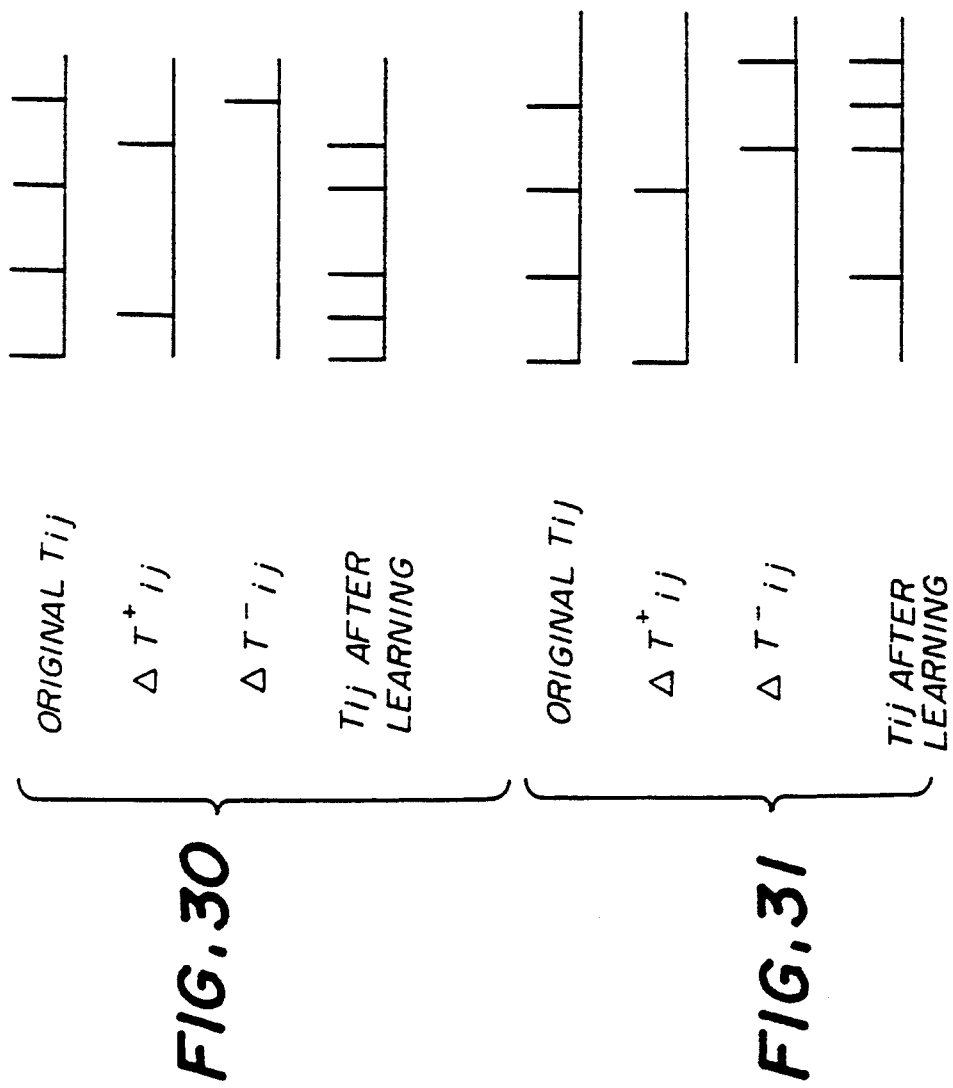

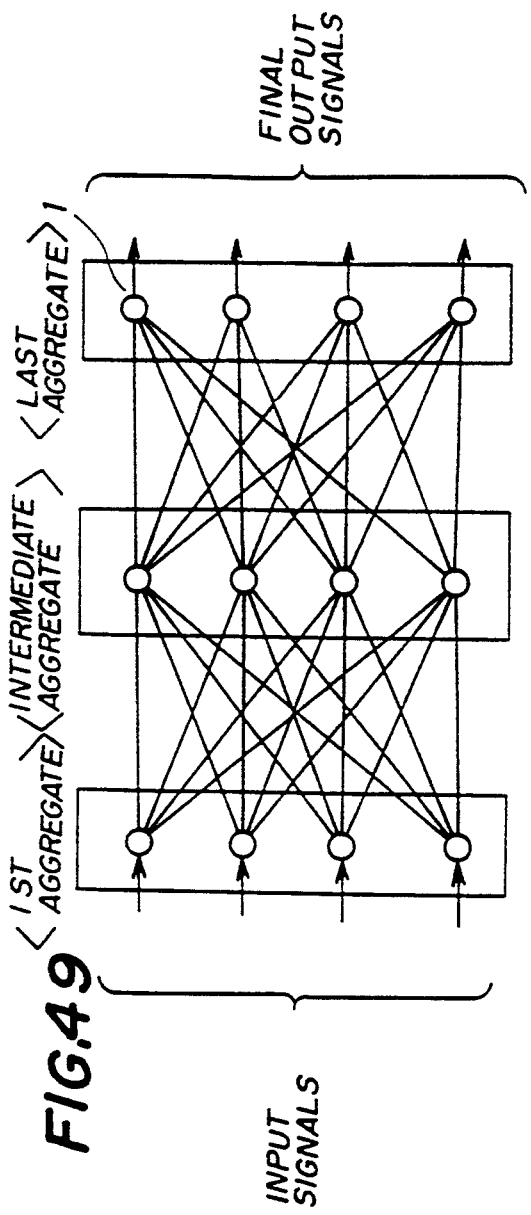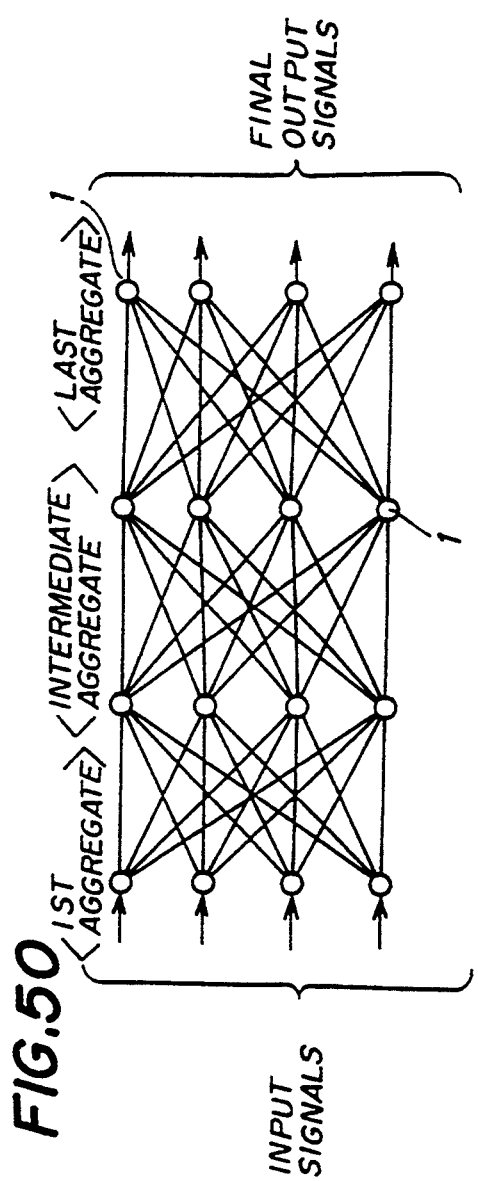

SIGNAL PROCESSING APPARATUS HAVING AT LEAST ONE NEURAL NETWORK

This is a continuation, of application Ser. No. 07/826,906, filed on Jan. 24, 1992 now U.S. Pat. No. 5,259,064.

BACKGROUND OF THE INVENTION (1) Field of the Invention

The present invention generally relates to a signal processing apparatus having at least one neural network, and more particularly to a signal processing circuit suitable for various control procedures, such as a position control procedure for a robot, a temperature control procedure for an air conditioner, an orbit control procedure for a rocket, and so on.

(2) Description of the Prior Art

Recently, there has been considerable research and development activity concerning systems that approximate the functions of neurons which are basic units in a living body, particularly, in the fields of character recognition, motion control and associative storage. A neural network includes a plurality of such neurons which are coupled in the form of a hierarchical network structure and intends to process information in parallel. Various neural networks realized by computer simulation have been reported. However, computer simulation necessitate handling of an extremely large amount of information. Hence, it is necessary to realize neural networks by means of hardware. For this requirement, various hardware neural networks have been researched and developed. However, many of the neural networks are realized by conventional Neumann computers and software.

Japanese Laid-Open Patent Application 2-201607 attempts an application of neural networks to unknown or complex control systems by means of hardware or software. FIG.1 shows the proposed application of neural networks. A control system shown in FIG.1 executes identification and control processes with respect to a controlled object 1, and makes an output of the controlled object 1 be always equal to a target value.

The control system is composed of a control unit 2, an identification unit 3, a learning unit 4, a subtracter 4a, and an input/output memory 5. The control unit 2 includes a neural network 2a, and the identification unit 3 includes a neural network 3a. The neural network 2a executes an operation on an internal signal that includes, as components, a past control input u(t) and a control output y(t-d). The control unit 2 generates the control input from the results of the above operation and a target value. The neural network 3a executes an operation on the internal signal, and the identification unit 3 generates an identification value from the results of this operation and the control output. The learning unit 4 calculates the difference (error) between the control unit (which serves as a teaching signal) and the identification value, and generates weighting factors based on the difference. The input/output memory 5 stores the control input u(t) and the control output y(t-d). Information read out from the input/output memory 5 is output, as the internal signal, to the neural networks 2a and 3a.

When the controlled object 1 is a system in which the input of the system varies with time, a variety of input and output information is prepared and stored, and then the neural networks 2a and 2b are made to learn by using the input and output information. These procedures are very complex. Further, a large-scale system having a computer and a memory is needed to make the neural networks 2a and 2b learn. Moreover, if the condition of the controlled object 1 changes, it is necessary to provide input and output information and make the neural networks 2a and 3a learn again. This procedure is very troublesome and prevents practical use of the signal processing apparatus using the neural network system.

SUMMARY OF THE INVENTION

It is a general object of the present invention to provide a signal processing apparatus in which the above disadvantages are eliminated.

A more specific object of the present invention is to provide a signal processing apparatus using a neural network having a learning function in which the neural network can be made to learn in real time. Thereby, the signal processing apparatus of the present invention can control a system in which the condition thereof changes with time.

The above objects of the present invention are achieved by a signal processing apparatus for controlling a controlled object, said signal processing apparatus comprising:

input means for converting an output signal from the controlled object into a network input signal, said network input signal being a pulse density signal having a pulse density defined by a number of first values and second values within a predetermined time, the first values and the second values being arranged at random, and the first and second values respectively corresponding to high and low binary signal levels;

a first neural network receiving the network input signal and outputting a network output signal, said network output signal being also said pulse density signal;

output means, coupled to said first neural network, for converting said network output signal into a control output signal applied to the controlled object;

teaching means for generating a teaching signal which makes the first neural network learn in real time; and error signal generating means, coupled to said first neural network and said teaching means, for generating an error signal from the teaching signal and information contained in said network output signal, said error signal controlling the first neural network so that the control output signal has correct control information with respect to the output signal from the controlled object.

BRIEF DESCRIPTION OF THE DRAWINGS

Other objects, features, and advantages of the present invention will become more apparent from the following detailed description when read in conjunction with the accompanying drawings, in which:

FIG. 8 is a block diagram of the teaching unit shown in FIG. 7 in more detail;

FIG. 14 is a diagram of a neural network used in the present invention;

FIG. 15 is a diagram for explaining a pulse train which describes an input signal of the first structure of the neuron unit;

FIG. 16 is a diagram for explaining a pulse train which describes a weight function of the first structure of the neuron unit;

FIGS. 22 and 23 are diagrams for explaining positive and negative error signals in the case of an excitatory coupling;

FIGS. 24 and 25 are diagrams for explaining positive and negative error signals in the case of an inhibitory coupling;

FIGS. 26 and 27 are diagrams for explaining examples of thinning out the error signal;

FIGS. 28 and 29 are diagrams for explaining a method of varying the weight function;

FIGS. 30 and 31 are diagrams for explaining a method of obtaining a new weight function for excitatory and inhibitory original weight function;

FIGS. 49 and 50 are system block diagrams of other neural networks used in the present invention.

DESCRIPTION OF THE PREFERRED EMBODIMENTS

Figure 1:
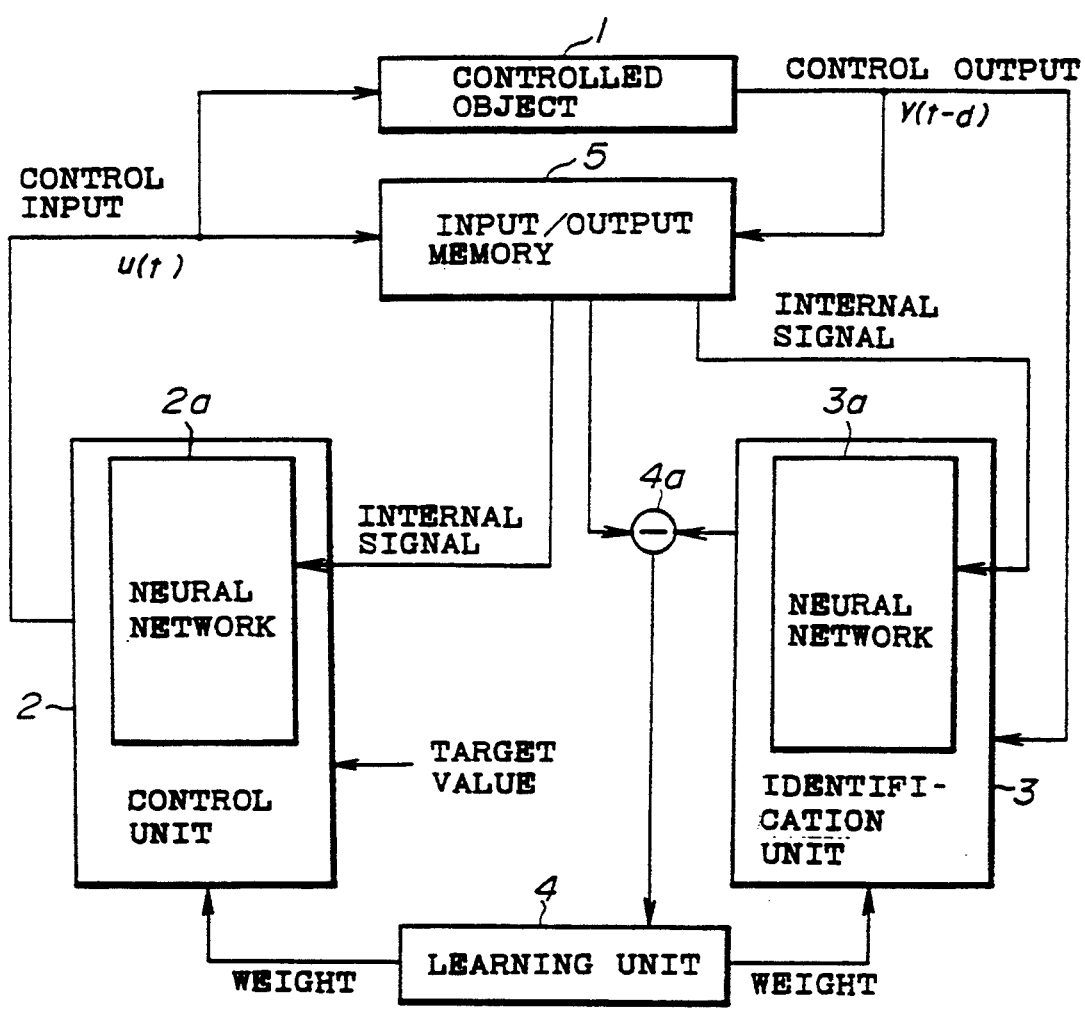
FIG. 1 is a block diagram of a conventional signal processing apparatus using neural networks.
Figure 2:
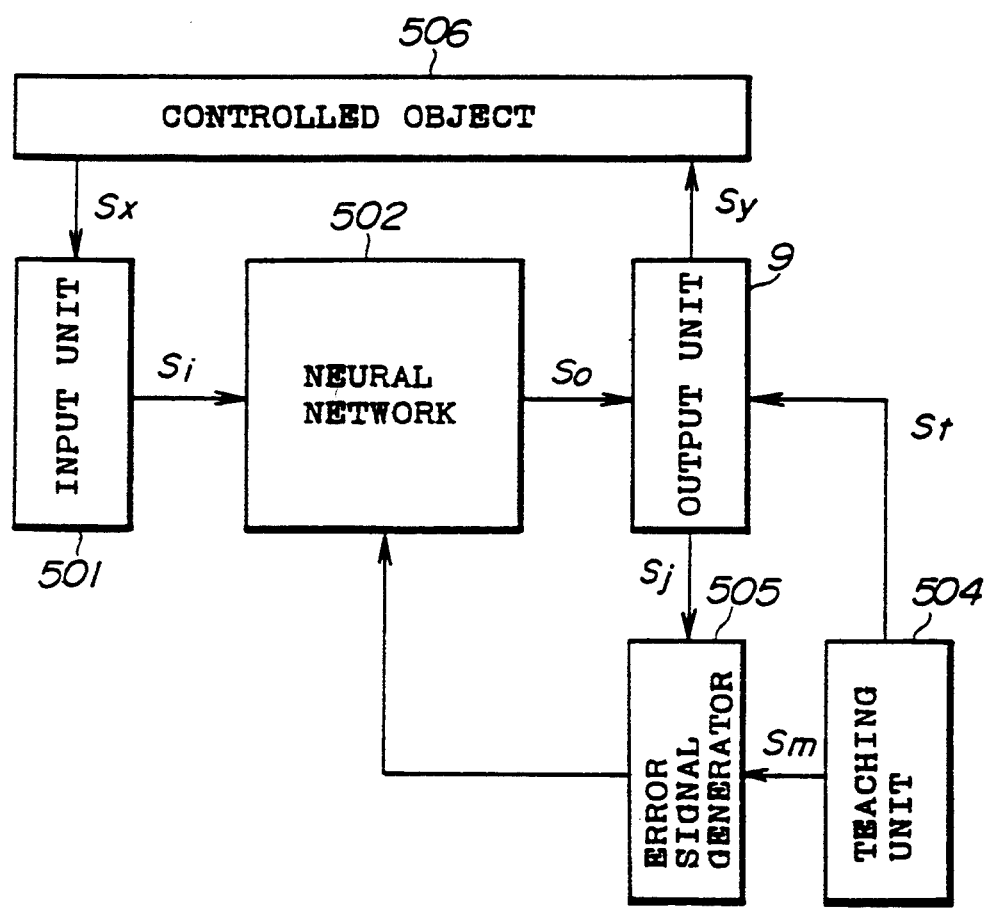
FIG. 2 is a block diagram of a first embodiment of the present invention.

FIG. 2 is a block diagram of a signal processing apparatus according to a first embodiment of the present invention. The signal processing apparatus shown in FIG. 2, which controls a controlled object 506, is composed of an input unit 501, a neural network 502, an output unit 503, a teaching unit 504, and an error signal generator 505. The controlled object 506 is a motion system, the condition of which changes with time. A change in the condition of the controlled object 506 is caused by a change of the system itself, a change in the ambient conditions, or both.

An output signal Sx from the controlled object 506 is input to the input unit 501, which functions as a preprocessing unit on the input side of the neural network 502. More specifically, the input unit 501 generates an input signal Si suitable for the neural network 502. The input signal Si has the same information as that of the output signal SX. As will be described later, the input signal Si is a pulse density signal. That is, the input unit 501 converts the output signal Sx into the pulse density signal Si. The neural network 502 functions as a signal processing unit. An output signal So of the neural network 502 is output to the output unit 503, which functions as a postprocessing unit. The output unit 503 converts the output signal So into a control output signal Sy, which is supplied to the controlled object 506. The output signal So of the neural network 502 is, for example, a pulse density signal. The control output signal Sy has the same information as the output signal So of the neural network 502.

The neural network 502 has a self-learning function, as will be described later. An output signal Sj output by the output unit 503 is input to the error signal generator 505. The output signal Sj has the same information as the output signal So of the neural network, but may have a signal format identical to or different from that of the output signal So. The teaching unit 504, which functions as a teaching signal generator, generates a teaching signal Sm which is a true control output or an output corresponding to the true control output. The teaching signal Sm is input to the error signal generator 505. The error signal generator 505 generates an error signal Sd from the output signal Sj from the output unit 503 and the teaching signal Sm from the teaching unit 504. The error signal Sd shows the difference between the signals Sj and Sm. The neural network 502 executes learning by using the error signal Sd so that the control output signal Sy suitable for the the output signal Sx from the controlled object 506 can be generated.

At the initial stage of the learning procedure (that is, learning by the neural network 502 is not yet completed), a teaching signal St is applied, as the control output signal Sy, to the controlled object 506 via the output unit 503. The teaching signal St has the same information as the teaching signal Sm but may have a format identical to or different from that of the teaching signal.

During the learning procedure, the controlled object 506 may not be controlled. While the controlled object 506 is controlled, the learning procedure may not be executed. It is also possible to execute the forward procedure for controlling the controlled object 506 and the learning procedure at the same time. It is also possible to generate the error signal Sd from the output signal Sj from the output unit 503 and the output signal Sx from the controlled object 506. It is not necessary to make the neural network 502 always learn by the error signal Sd. It is possible to generate the control output signal Sy only when it is determined that the control output signal Sy which is generated by the neural network 502 at the present time is not appropriate.

Figure 3A:
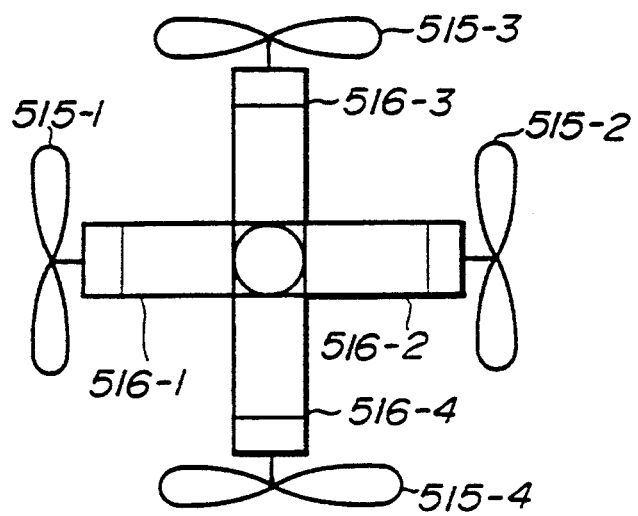
FIGS.3A and 3B are diagrams showing a controlled object shown in FIG. 2.
Figure 3B:
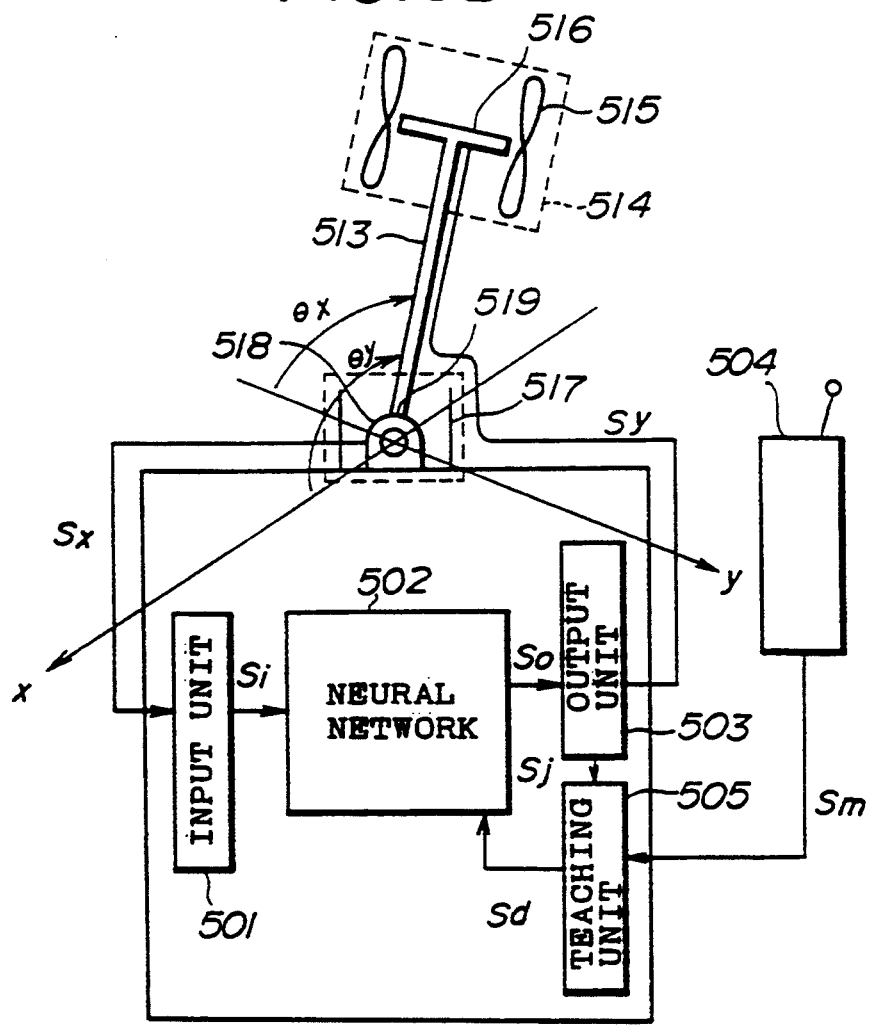

FIGS. 3A and 3B show an example of the controlled object 506. The controlled object 506 shown in FIGS. 3A and 3B is a two-dimensional handstanding pendulum. The signal control apparatus shown in FIG. 2 controls a pendulum 513 so that it always stands vertically or upright. A driving part 514 is mounted on top of the pendulum 513. The driving part 514 is composed of four propellers 515-1–515-4 and motors 516-1–516-4 which drive the propellers 515-1–515-4, respectively. The pendulum 513 is supported by a mounting member 517 so that the pendulum 513 is free to pivot on the mounting member 517 in all directions. An angle detector 519 composed of two potentiometers 518 (definitely shown in FIG. 4) is installed in the mounting member 517. One of the two potentiometers 518 detects an angle Ox of the pendulum 513 in an x direction, and the other potentiometer 518 detects an angle Oy thereof in a y direction axis orthogonal to the x direction. It is also possible to use rotary encoders or the like instead of the potentiometers 518.

Figure 4:
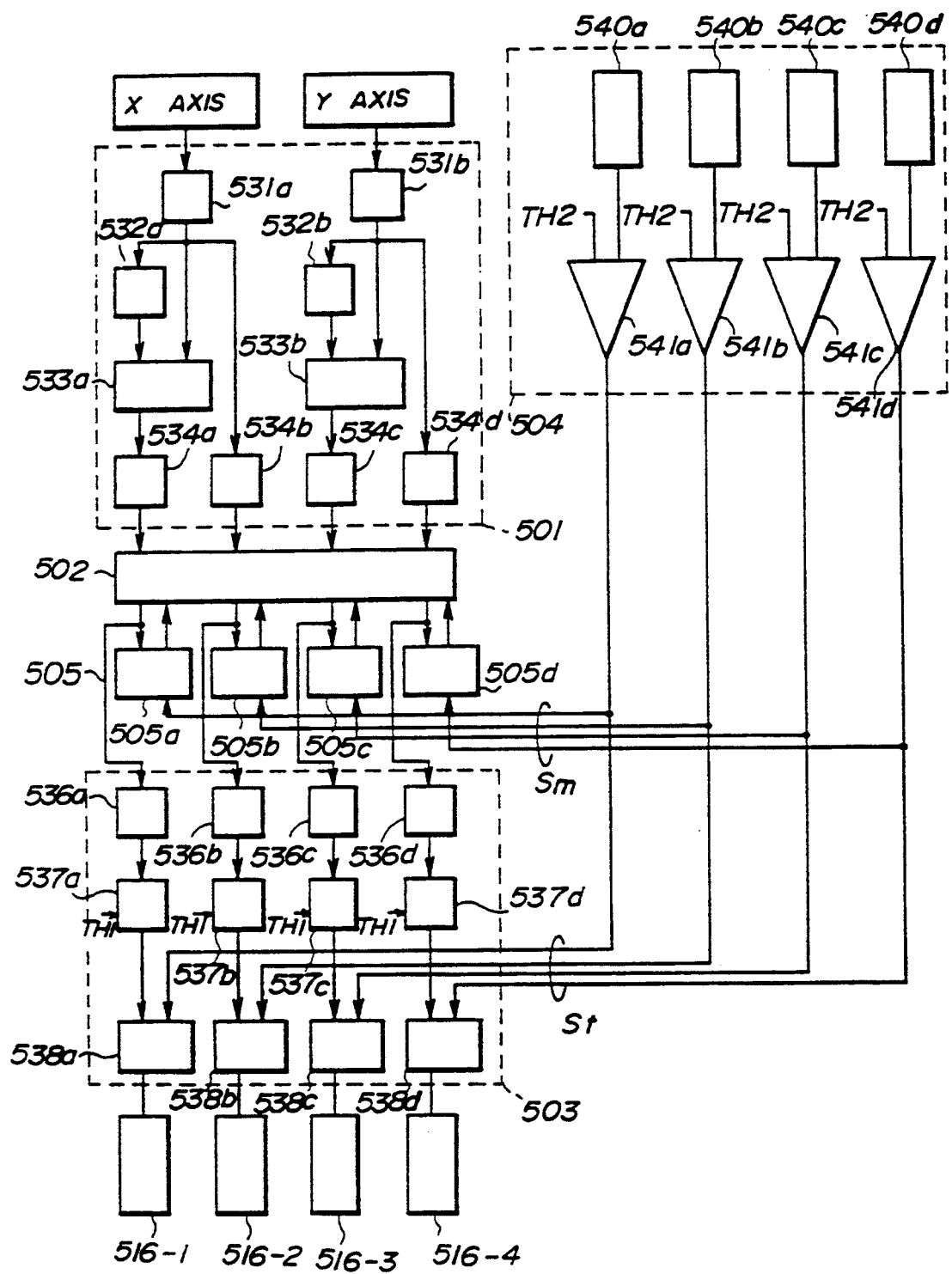
FIG. 4 is a block diagram of a signal processing apparatus shown in FIG. 2.

FIG. 4 is a block diagram of the signal processing apparatus shown in FIG. 2. The input unit 501 is composed of A/D (Analog to Digital) converters 531a and 531b, D-type latch elements 532a and 532b, comparators 533a and 533b, and pulse train generators 534a through 534d. Information about the angle Ox of the pendulum 513 is input to the A/D converter 531a, and information about the angle Oy of the pendulum 513 is input to the A/D converter 531b. A digital signal indicative of the angle Ox is generated by the A/D converter 531a and input to the latch element 532a and the comparator 533b. The latch element 532a delays the digital signal by a unit time. The comparator 533a compares the digital signal from the A/D converter 531a with a delayed digital signal from the latch element 532a, and generates a signal indicating an angular velocity. The signal from the comparator 533a is converted into a pulse density signal (a pulse train) by the pulse train generator 534a. The digital signal from the A/D converter 531a is converted into a pulse density signal (a pulse train) by the pulse train generator 534b. This pulse density signal indicates the angle Ox. These pulse density signals are output to the neural network 502. The digital signal output by the A/D converter 531b is processed in the same manner as described above, and pulse density signals generated by the pulse train generators 534c and 534d are output to the neural network 502. Each of the pulse train generators 534a–534d can be formed with an M-series random number generator composed of a plurality of stages of shift registers, and a comparator which compares an output signal of the random number generator with data about angle.

The neural network 502 outputs to the output unit 503 the output signal So, which is a pulse train. The output signal So consists of four components. Two of the components are related to the angle Ox and the angular velocity related to the x direction, and the other two components are related to the angle Oy and the angular velocity related to the y direction.

The output unit 503 is composed of four counters 536a–536d, four comparators 537a–537d, and four selectors 538a–548d. Each of the counters 536a–536d counts the number of pulses contained in the corresponding pulse train. Each of the comparators 537a–537d compares the number of pulses counted by the related counter with a predetermined threshold value TH1. When the number of pulses becomes larger than the threshold value TH1, each comparator generates a binary "1". When the number of pulses is smaller than or equal to the threshold value TH1, each comparator generates a binary "0". Since the input unit 501, the neural network 502, and the output unit 503 operate at a high speed, each of the comparators 537a–537d generates a pulse train, and each of the motors 516-1–516-4 is driven by a pulse width modulation. It is also possible to drive each of the motors 516-1–516-4 by an analog voltage (or current) based on the counter value of each of the counters 536a–536d. It is also possible to directly apply the counter values of the counters 536a–536d to the motors 516-1–516-4. The motors 516-1–516-4 rotate the propellers 515-1–515-4, which move the pendulum 513 so that it stands vertically.

The teaching unit 504 is composed of potentiometers 540a–540d, and comparators 541a–541d. The potentiometers 540a–540d are connected to a joy stick (not shown for the sake of simplicity), and generate signals indicating an inclined angle of the joy stick in the x and y directions. The comparators 541a–541d compare output signals of the potentiometers 540a–540d with a predetermined threshold value TH2. Each of the comparators 541a–541d generates a binary signal which turns ON the related motor when the output signal of the related potentiometer becomes larger than the threshold value TH2. When the output signal of the potentiometer is smaller than or equal to the threshold value TH2, each of the comparators 541a–541d turns OFF the related motor.

While the neural network 502 is learning, the selector 538a–538d select the teaching signals St from the comparators 541a–541d, respectively, and an operator manipulates the joy stick so that the pendulum 513 stands upright. During this operation, it is also possible to select the pulse trains from the comparators 537a–537d. The teaching signals from the comparators 541a–541d are also applied, as the teaching signal Sm, to the error signal generator blocks 505a–505d of the error signal generator 505. Each of the error signal generator blocks 505a–505d compares the output signal from the neural network 502 with the related teaching signal, and generates the error signal Sd therefrom. For example, when the teaching signal from the comparator 541a is "1" and the output signal from the neural network 502 is "0", the error signal generated by the error signal generator block 50a makes the neural network 502 learn so that the neural network 502 generates "1". The teaching signal components from the teaching unit 504 are not limited to the binary signal, but instead may be analog signals as output by the angle detector 517. In this case, the analog teaching signal components are converted into digital signals in the output unit 503.

A description will now be given of a second embodiment of the present invention with reference to FIG. 5. A signal processing apparatus shown in FIG. 5, which controls a controlled object 606, is composed of an input unit 601, a neural network 602, an output unit 603, a teaching unit 604, and an error signal generator 605. The controlled object 606 is a motion system, the condition of which changes with time. A change in the condition of the controlled object 606 is caused by a change of the system itself, or a change in the ambient conditions, or both.

An output signal Sx from the controlled object 606 is input to the input unit 601, which functions as a preprocessing unit on the input side of the neural network 602. More specifically, the input unit 601 generates an input signal Si suitable for the neural network 602. The input signal Si has the same information as that of the output signal Sx. As will be described later, the input signal Si is a pulse density signal. That is, the input unit 601 converts the output signal Sx into the pulse density signal Si. The neural network 602 functions as a signal processing unit. An output signal So of the neural network 602 is output to the output unit 603, which functions as a postprocessing unit. The output unit 603 converts the output signal So into a control output signal Sy, which is supplied to the controlled object 606. The output signal So of the neural network 602 is, for example, a pulse density signal. The control output signal Sy has the same information as the output signal So of the neural network 602.

The neural network 602 has a self-learning function, as will be described later. An output signal Sj output by the output signal 603 is input to the error signal generator 605. The output signal Sj has the same information as the output signal So of the neural network, but may have a format identical to or different from that of the output signal So.

The teaching unit 604, which functions as a teaching signal generator, generates a teaching signal Sm from an input signal Sh and an output signal Sl. The input signal Sh, which is output by the input unit 601, has the same information as that of the output signal Sx, but may have a signal format identical to or different from that of the output signal. The output signal Sl, which is output by the output unit 601, has the same information as that of the output signal So, but may have a signal format identical to or different from that of the output signal So. It is preferable that the signal Sh has the same signal format as the signal Sl. The teaching unit 604 further generates a signal Sk, which indicates that the neural network 602 should be made learn by an error signal Sd generated by the error signal generator 605 from the output signal Sj from the output unit 603 and the teaching signal Sm from the teaching unit 604. The error signal shows the difference between the signals Sj and Sm. The neural network 602 executes learning by using the error signal Sd so that the control output signal Sy suitable for the the output signal Sx from the controlled object 606 can be generated.

During the learning procedure, the controlled object 606 may not be controlled. While the controlled object 606 is controlled, the learning procedure may not be executed. It is also possible to generate the error signal from the output signal Sj from the output unit 603 and the output signal Sx from the controlled object 606. It is not necessary to make the neural network 602 always learn by the error signal Sd. It is possible to generate the control output signal Sy only when it is determined that the control output signal Sy which is generated by the neural network 602 at the present time is not appropriate.

Figure 5:
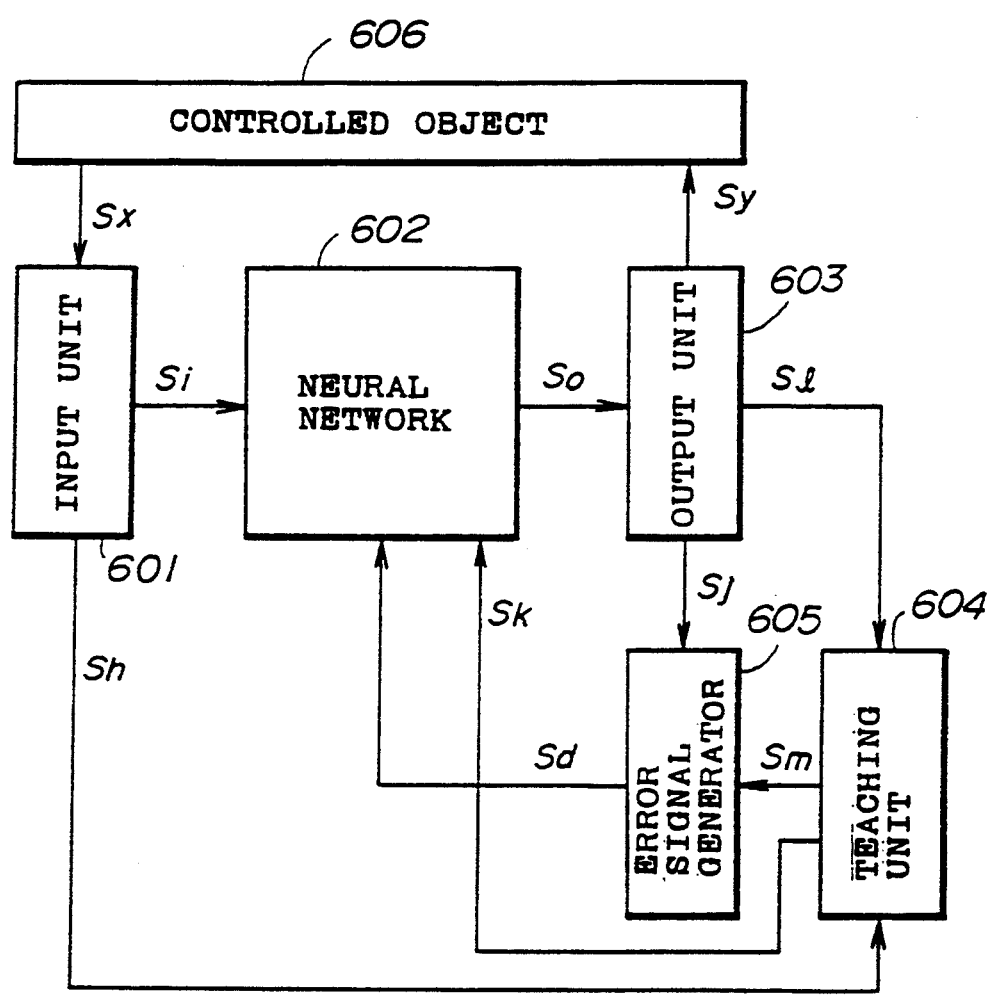
FIG. 5 is a block diagram of a second embodiment of the present invention.
Figure 6:
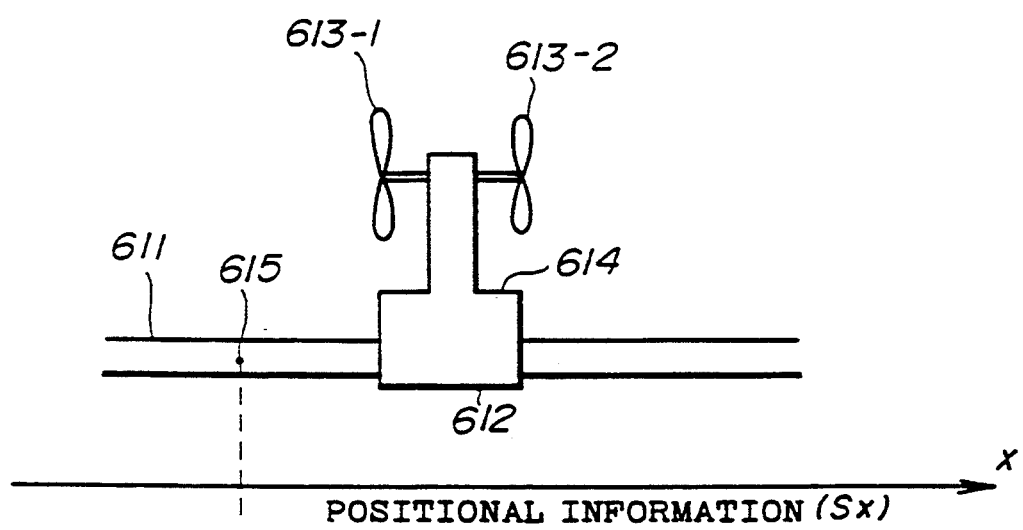
FIG. 6 is a diagram of a controlled object shown in FIG. 5.

FIG. 6 shows an example of the controlled object 606, which is a one-dimensional reciprocal motion system. As shown, this system is composed of a rail 611, a slidable driving part 614, two propellers 613-1 and 613-2, and two motors (not shown in FIG. 6). The signal control apparatus shown in FIG. 5 is installed in an inner part 614 of the driving part 612. The signal processing apparatus slides the driving part 612 along the rail 611 by thrust generated by the propellers 613-1 and 613-2, and stops the driving part 612 at a position 615. The neural network 602 shown in FIG. 5 inputs information related to the position, speed and acceleration (or information about positions obtained in the time series) of the driving part 612, and outputs a voltage applied to the motors for driving the propellers 613-1 and 613-2. Information about the position of the driving part 612 can be obtained by applying a voltage to the rail 611 so that the voltage gradually changes in accordance with positions on the rail 611. Further, the speed and acceleration of the driving part 612 can be obtained from the information about the position of the driving part 612.

Figure 7:
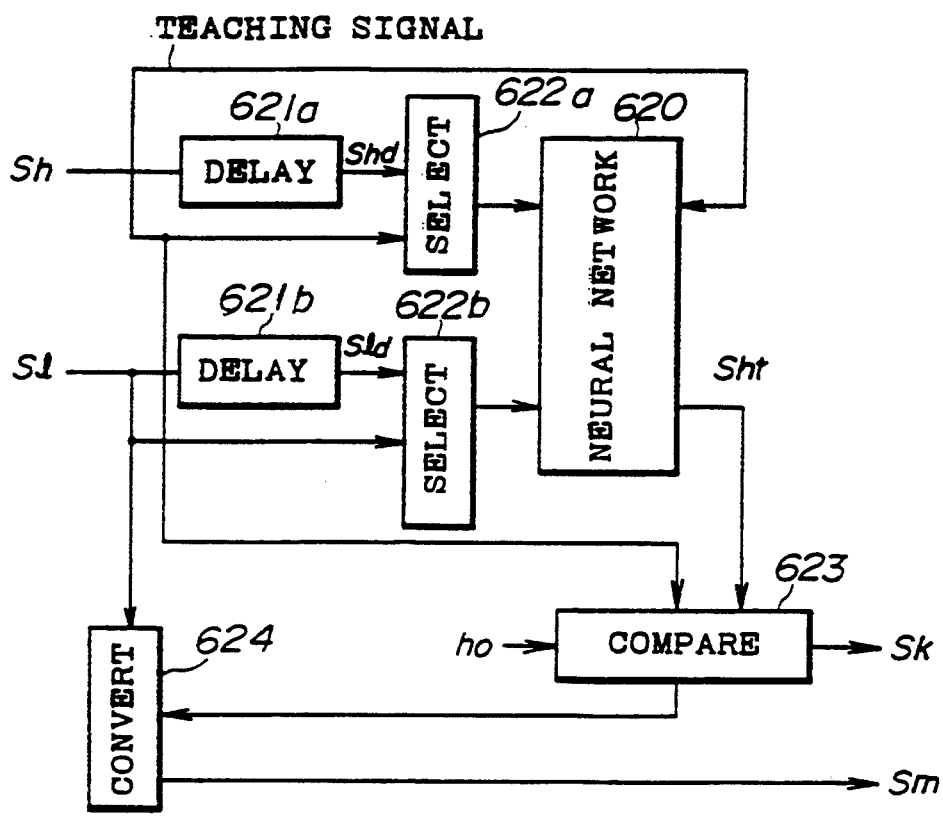
FIG. 7 is a block diagram of a teaching unit shown in FIG. 5.

FIG. 7 is a block diagram of the teaching unit 606 shown in FIG. 5. The teaching unit shown in FIG. 7, which automatically generates the teaching signal Sm from the input signal Sh and the output signal Sl, is composed of a neural network 620, delay units 621a and 621b, selectors 622a and 622b, a comparator 623 and a converter 624. The input signal Sh having the same information as that of the output signal Sx from the controlled object 606 is directly applied to the selector 622a and applied thereto via the delay unit 621a. A delayed version of the input signal Sh is shown as Shd. The input signal Sh is further applied to the neural network 620 as a teaching signal. Similarly, the output signal Sl having the same information as that of the output signal So is directly applied to the selector 622b and applied thereto via the delay unit 621b. A delayed version of the input signal Sl is shown as Shl.

While the neural network 602 learns, the selectors 622a and 622b select the delayed signals Shd and Sld. The neural network 620 generates, from the delayed signals Shd and Sld and the input signal Sh (teaching signal), a signal Sht which corresponds to a signal obtained by converting an input signal Sxt output from the controlled object 606 at the next time. When this learning procedure is completed, the neural network 620 generates the correct signal Sht (identical to the teaching signal Sh). Hence, the neural network 620 can predict a future input signal which will be output by the controlled object 606. In the predicting process (forward process), the selectors 622a and 622b select the signals Sh and Sl.

The comparator 623 compares the predicted signal Sht and the current signal Sh with a target value ho. When the signal Sh is closer to the target value ho than the predicted signal Sht, the comparator 623 makes the converter 624 convert the signal Sl into the error signal Sm. Then, the neural network 602 is made learn by using the error signal Sm. In this case, the comparator 623 makes the signal Sk active. When the signal Sh is closer to the predicted signal Sht than the target value ho, the comparator 623 makes the signal Sk inactive.

FIG. 8 shows the structure shown in FIG. 7 in more detail. The input signal Sh consists of three digital signal components related to the position, speed and acceleration of the driving part 612 shown in FIG. 6. The output signal Sl consists of two digital signal components related to the revolutions of the propellers 613-1 and 613-2. With respect to these signal components, delay units 630a–630e, selectors 631a–631e, and pulse train generators 632a–632e are respectively provided. The component of the signal Sh related to the position of the driving part 612 is applied to a pulse train generator 634, which generates a pulse train (a pulse density signal) used as the teaching signal. Each of the pulse train generators 632a–632e generates a pulse train (pulse density signal).

During learning of the neural network 620, the pulse train generators 632a–632e generate pulse trains corresponding to delayed versions of the signal components of the signals Sh and Sl. As has been pointed out previously, the teaching signal is a pulse density signal showing the current position of the driving part 612.

The output signal Sht of the neural network 620 obtained by inputting data about the current position of the driving part 612 is input to an up-count terminal of an up/down counter 639 and a counter 642. The data about the current position of the driving part 612 is input to an up-count terminal of an up/down counter 638 and a counter 643. A pulse generator 637 generates a pulse train (a pulse density signal) corresponding to the aforementioned target value ho. A comparator 640 compares output signals of the up/down counters 638 and 639 with each other. If the current position of the driving part 612 is closer than the target value than the position indicated by the signal Sht, the comparator makes the signal Sk active.

Figure 9:
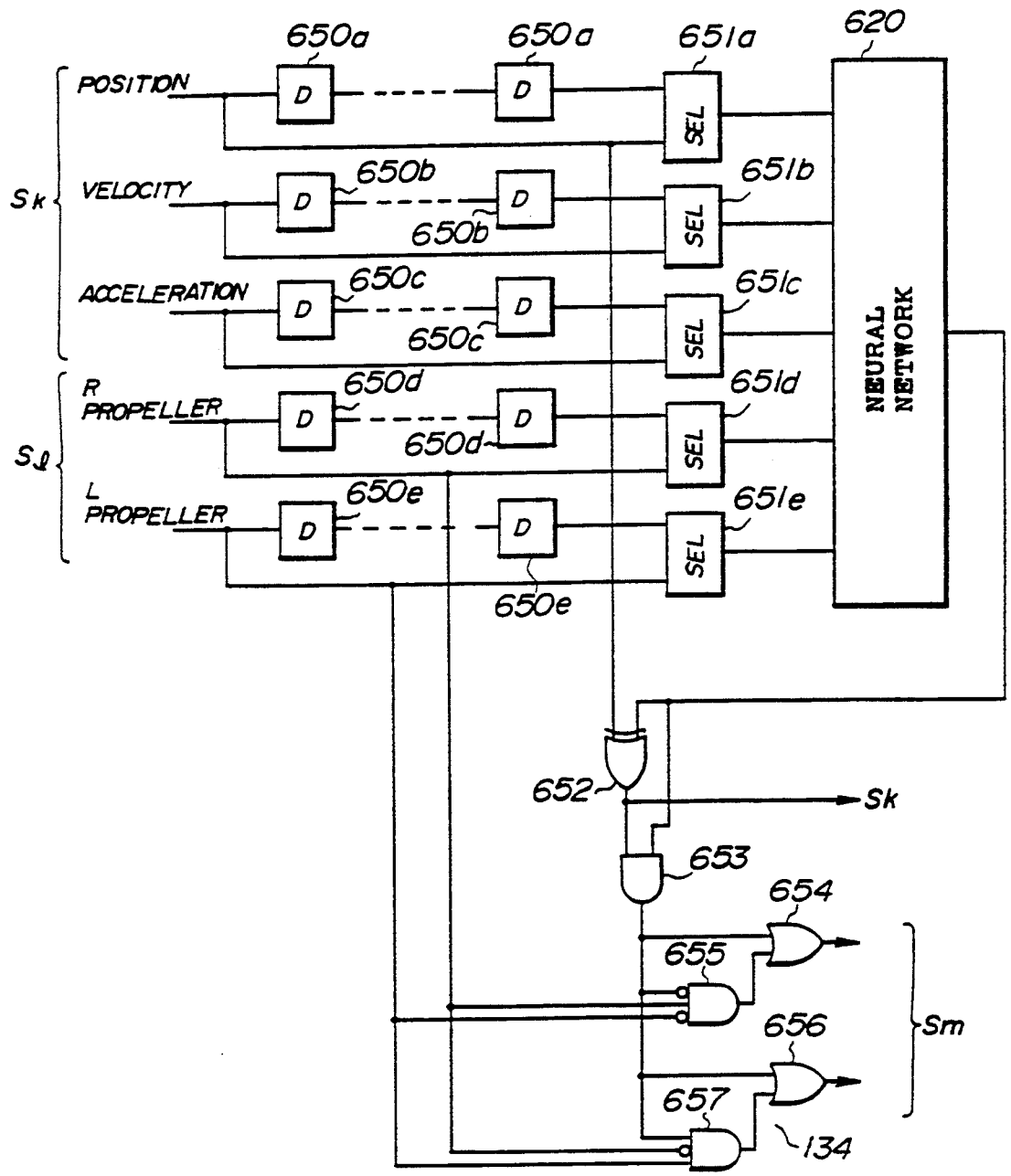
FIG. 9 is a block diagram of the teaching unit shown in FIG. 7 in more detail.

The teaching signal Sm is generated as follows. Two up/down counters 635 and 636 have preset values indicating revolutions of the propellers 613-1 and 613-2 shown in FIG. 6. The preset values are written into the up/down counters 635 and 636 via loading terminals L thereof. A comparator 641 compares the number of pulses counted by the counter 642 with the number of pulses counted by the counter 643. If the number of pulses contained in the predicted signal Sht is larger than the number of pulses contained in the pulse train showing the current position of the driving part 612, the comparator 641 generates a signal via its output terminal 1. If the number of pulses contained in the pulse train showing the current position of the driving part 612 is larger than the number of pulses contained in the predicted signal Sht, the comparator generates a signal via its output terminal 2. The output terminal 1 of the comparator 641 is connected to an up-count terminal of the up/down counter 635 and a down-count terminal of the up/down counter 636. The output terminal 2 of the comparator 641 is connected to a down-count terminal of the up/down counter 635 and an up-count terminal of the up/down counter 636. The up-down counters 635 and 636, which forms the converter 624 shown in FIG. 7, create the teaching signal Sm, which consists of two signal components. When the counter value of the up/down counter 635 decreases from the present value, the motor driving the propeller 613-2 is not driven. Similarly, when the counter value of the up/down counter 636 decreases from the present value, the motor driving the propeller 613-1 is not driven FIG. 9 is a block diagram of another structure of the teaching unit 604 shown in FIG. 7. The teaching unit 604 shown in FIG. 9 has, for each of the five pulse trains, a plurality of cascaded delay units (D) and a selector. For example, cascaded delay units 650a and a selector 651a are provided for the pulse train indicating the current position of the driving part 612. Similarly, delay units 650b–650e and selectors 651b–651e are provided. The comparator 623 shown in FIG. 7 is composed of an exclusive-OR gate 652 and an AND gate 653, and the converter 624 shown in FIG. 7 is composed of three-input AND gates 655 and 657, and two OR gates 654 and 656. The exclusive-OR gate 652 makes the signal Sk active when the predicted position of the driving part 612 is different from the current position thereof. The teaching signal Sk is generated by the gates as shown in FIG. 9

Figure 10:
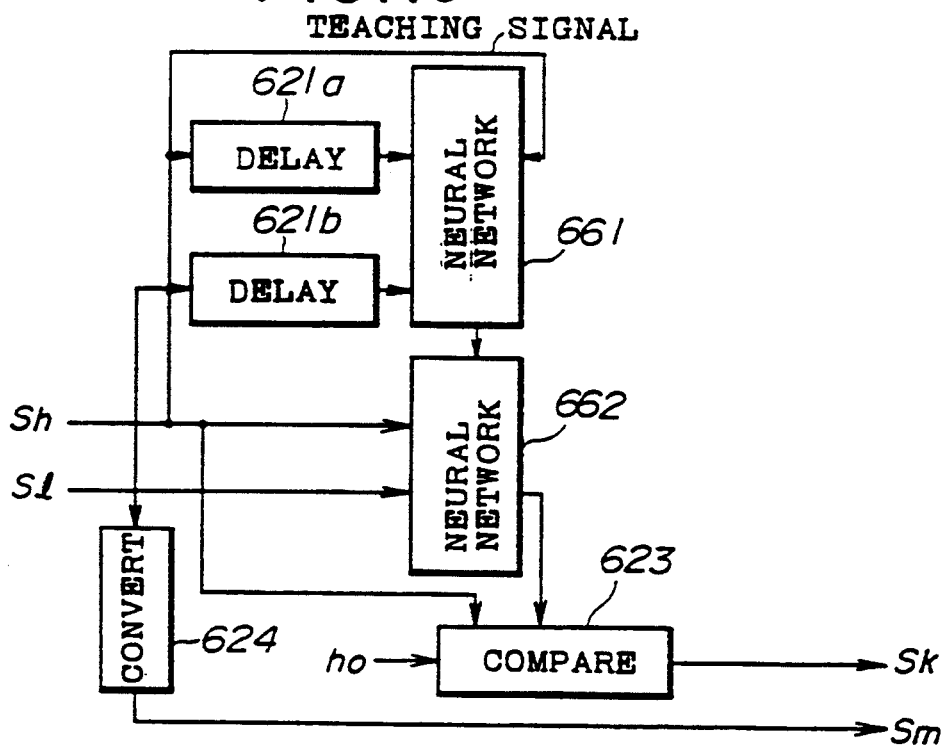
FIG. 10 is a block diagram of another structure of the teaching unit shown in FIG. 5.

FIG. 10 shows another structure of the teaching unit 604 shown in FIG. 5. In FIG. 10, parts which are the same as those shown in FIG. 5 are given the same reference numerals. The teaching unit 604 shown in FIG. 5 simultaneously executes the forward process and the learning process. For this operation, two neural networks 661 and 662 are provided. The neural network 661 is used for the learning process, and the neural network 662 is used for the forward process. Weighting coefficient values are transferred from the neural network 661 to the neural network 662.

Figure 11:
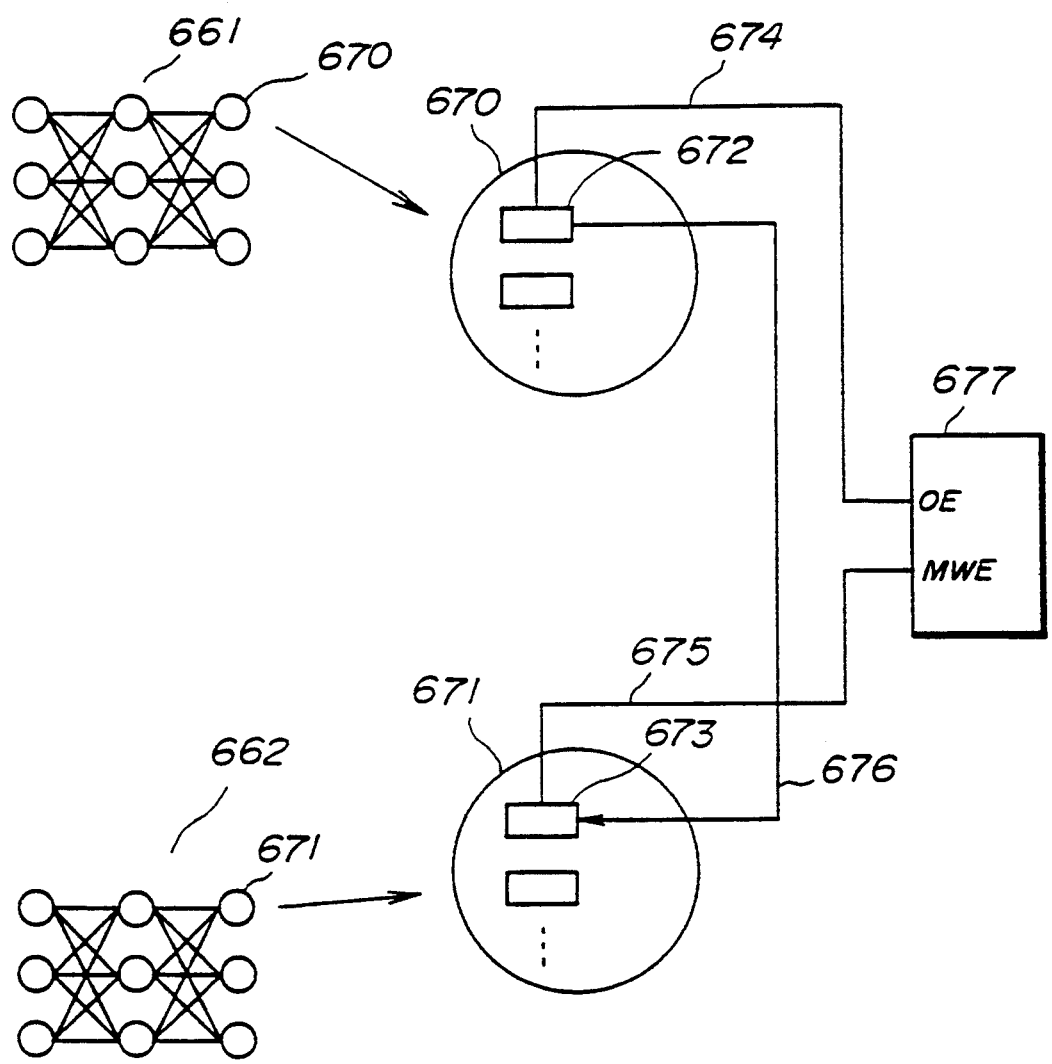
FIG. 11 is a block diagram of the structure shown in FIG. 10 in more detail.

FIG. 11 shows how the weighting coefficient values are transferred from the neural network 661 to the neural network 662. The neural network 661 includes a plurality of neurons 760 connected as shown in FIG. 11. Similarly, the neural network 662 includes a plurality of neurons 761 connected as shown in FIG. 11. The neural network 661 has the same structure as the neural network 662. Each of the neurons 760 includes a plurality of memories 672, and each of the neurons 761 includes a plurality of memories 763. A controller 677 makes an output enable signal 674 active, and then data is read out form the memory 672 and output to a signal line 676. The controller 677 makes a write enable signal 675 active, and then data is written into the corresponding memory 673 of the neuron 671 which is located at the same position as the neuron 670. The structure of the neural network used in the present invention will be described in more detail later.

Figure 12:
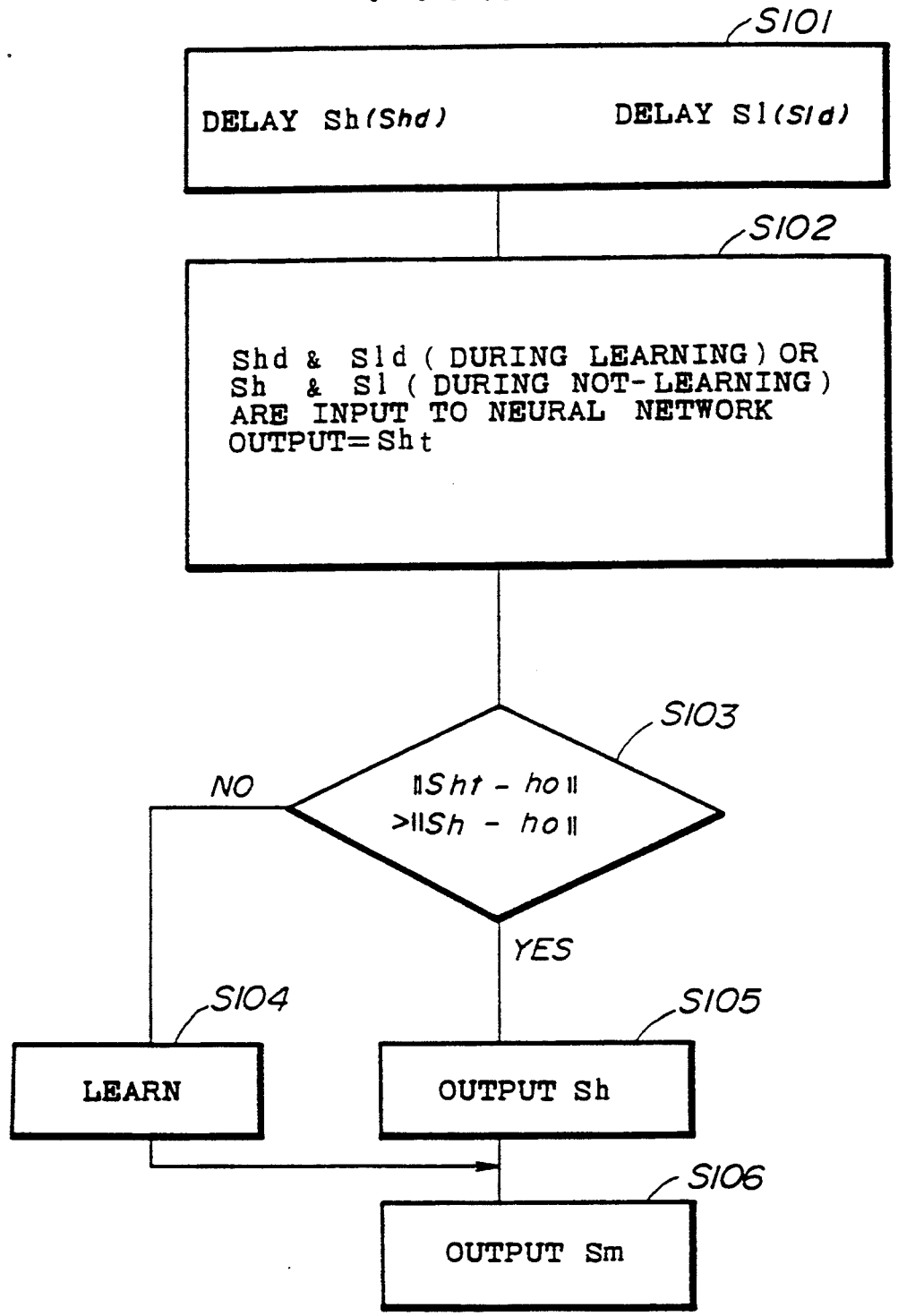
FIG. 12 is a flowchart of the operation of the second embodiment of the present invention.

FIG. 12 is a flowchart showing the above-mentioned operation of the teaching unit 604. At step S101, the signals Sh and Sl are delayed to generate the delayed versions Shd and Sld. At step S102, the delayed versions Shd and Sld are output to the neural network in the learning process, and the signals Sh and Sl are output thereto in the forward process. When it is determined, at step S103, that the value of the signal Sht (the predicted position of the driving part 612) is equal or closer to the target value (target position) than the signal Sh (indicating the current position of the driving part 612), the neural network 602 is not made to learn at step S104. When it is determined, at step S103, that the signal Sh is closer to the target value than the signal Sht, the signal Sk is made active at step S105. The teaching signal Sm is generated and output at step S106.

A description will be given of a first possible structure of the neuron unit used in the present invention. In this structure, the neuron unit is realized by use of digital circuits (hardware) according to the following rules [1] through [6], as disclosed in U.S. patent application Ser. No. 629,632 filed Dec. 18, 1990, the disclosure of which is hereby incorporated by reference.

[1] Input and output signals of the neuron unit, intermediate signals within the neuron unit, the weight function, the teaching signal and the like are all take the form of a pulse train described by binary values "0" and "1".

[2] The signal quantity within the neural network is expressed by the pulse density, that is, the number of "1"s within a predetermined time.

[3] The calculation within the neuron unit is described by a logic operation of pulse trains.

[4] The pulse train expressing the weight function is stored in a memory.

[5] The learning is realized by rewriting the pulse train of the weight function stored in the memory.

[6] When learning, an error is calculated based on a pulse train of the given teaching signal, and the pulse train of the weight function is varied depending on the calculated error. The calculation of the error and the calculation of the deviation of the weight function are carried out by logic operations of pulse trains described by "0"s and "1"s.

Figure 13:
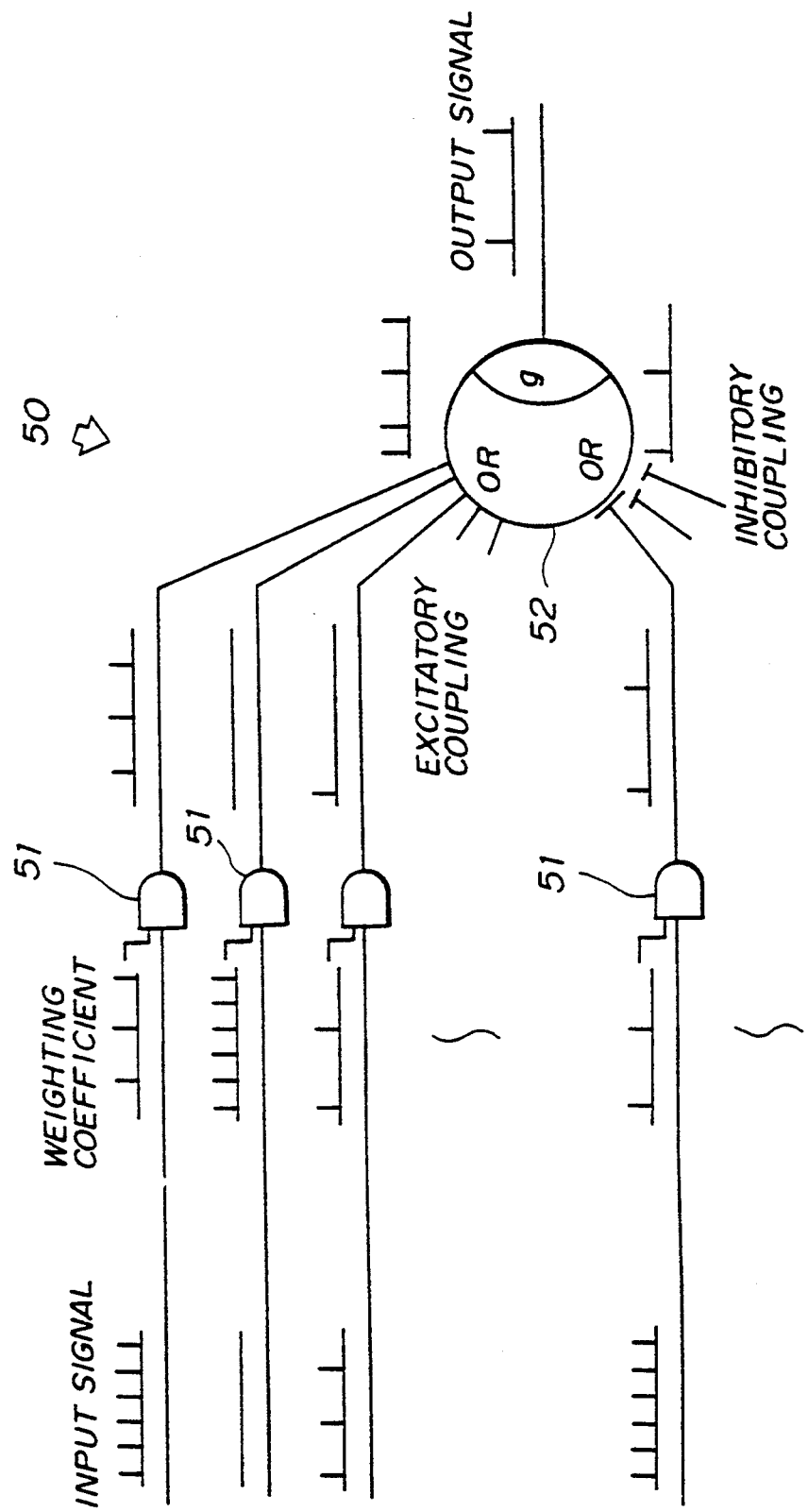
FIG. 13 is a circuit diagram showing a first structure of the neuron unit used in the present invention.

FIG. 13 shows a neuron unit 50, and a plurality of such neuron units 50 are connected in a plurality of layers to form a hierarchical neural network shown in FIG. 14, for example. The input and output signals of the neuron unit 50 are all described in binary by "1"s and "0"s and are synchronized. The signal intensity of the input signal $y_i$ is expressed by a pulse density, that is, a number of "1"s existing in a pulse train within a predetermined time. FIG. 15 shows a case where four "1"s and two "0"s of the input signal $y_i$ exist within the predetermined time amounting to six synchronizing pulses. In this case, the input signal $y_i$ has a signal intensity 4/6. It is desirable that the "1"s and "0"s of the input signal $y_i$ are positioned at random within the predetermined time.

On the other hand, the weighting coefficient $T_{ij}$ is similarly described by a pulse density, and is stored in a memory as a pulse train of "0"s and "1"s. FIG. 16 shows a case where three "1"s and three "0"s of the weight function $T_{ij}$ exist within the predetermined time amounting to six synchronizing pulses. In this case, the weight function $T_{ij}$ has a value 3/6. It is desirable that the "1"s and "0"s of the weight function $T_{ij}$ are positioned at random within the predetermined time.

Figure 17:
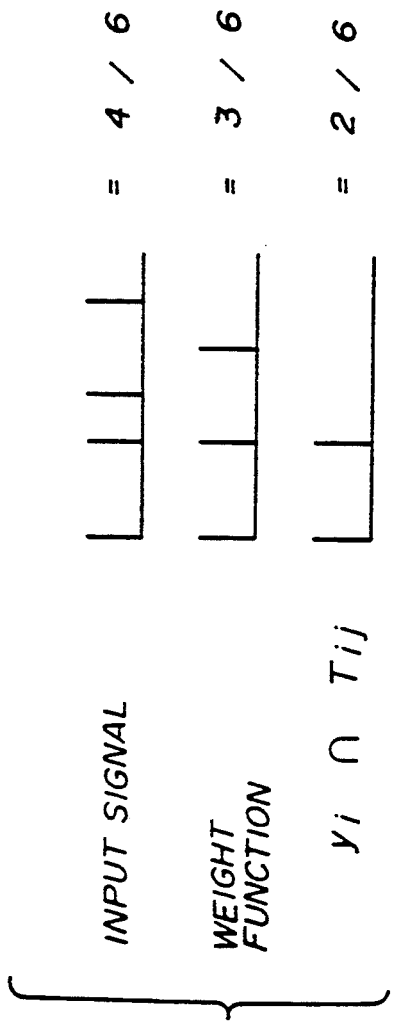
FIG. 17 is a diagram for explaining a logical product of the input signal and the weight function.

The pulse train of the weight function $T_{ij}$ is successively read from the memory responsive to the synchronizing pulses and supplied to each AND gate 51 shown in FIG. 13 which obtains a logical product $(y_i \cap T_{ij})$ with the pulse train of the input signal $y_i$. An output of the AND gate 51 is used as an input to the neuron unit 50. Hence, in the case described above, the logical product $y_i \cap T_{ij}$ becomes as shown in FIG. 17 and a pulse train "101000" is obtained. It can be seen from FIG. 17 that the input signal $y_i$ is converted by the weight function $T_{ij}$ and the pulse density becomes 2/6.

The pulse density of the output signal of the AND gate 51 is approximately the product of the pulse density of the input signal and the pulse density of the weight function, and the AND gate 51 acts similarly as in the case of the analog circuit. The pulse density of the output signal of the AND gate 51 more closely approximates the above product as the pulse train becomes longer and as the locations of the "1"s and "0"s become more at random. When the pulse train of the weight function is short compared to the pulse train of the input signal and no further data can be read out from the memory, the data can be read out from the first data and repeat such an operation until the pulse train of the input signal ends.

Figure 18:
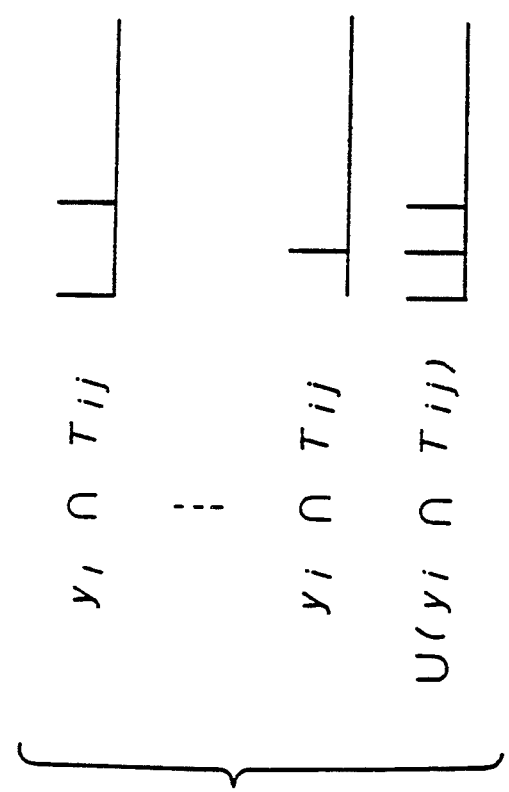
FIG. 18 is a diagram for explaining an output of the first structure of the neuron unit.

One neuron unit 50 receives a plurality of input signals, and a plurality of logical products are obtained between the input signal and the weight function. Hence, an OR circuit 52 obtains a logical sum of the logical products. Since the input signals are synchronized, the logical sum becomes "111000" when the first logical product is "101000" and the second logical product is "010000", for example. FIG. 18 shows the logical products input to the OR circuit 52 and the logical sum $\cup (y_i \cap T_{ij})$ which is output from the OR circuit 52. This corresponds to the calculation of the sum and the non-linear function (sigmoid function) in the case of the analog calculation.

When the pulse densities are low, the logical sum of such pulse densities is approximately the sum of the pulse densities. As the pulse densities become higher, the output of the OR circuit 52 saturates and no longer approximates the sum of the pulse densities, that is, the non-linear characteristic begins to show. In the case of the logical sum, the pulse density will not become greater than "1" and will not become smaller than "0". In addition, the logical sum displays a monotonous increase and is approximately the same as the sigmoid function.

As described above, there are two types of couplings (or weighting), namely, the excitatory coupling and the inhibitory coupling. When making numerical calculations, the excitatory and inhibitory couplings are described by positive and negative signs on the weight function. In the case of the analog neuron unit, when the weight function $T_{ij}$ indicates the inhibitory coupling and the sign on the weight function $T_{ij}$ is negative, an inverting amplifier is used to make an inversion and a coupling to another neuron unit is made via a resistance which corresponds to the weight function $T_{ij}$.

On the other hand, in this structure which uses digital circuits, the couplings are leaded into an excitatory group and an inhibitory group depending on the positive and negative signs on the weight function $T_{ij}$. Then, the calculation up to the part where the logical sum of the logical products of the pulse trains of the input signals and the weight functions are carried out for each group. Thereafter, the neuron unit 50 outputs "1" when only the output of the excitatory group is "1" and outputs "0" when only the output of the inhibitory group is "1". When the outputs of the excitatory and inhibitory groups are both "1" or both "0", the neuron unit 50 may output either "1" or "0" or output "1" with a probability of ½.

Figure 19:
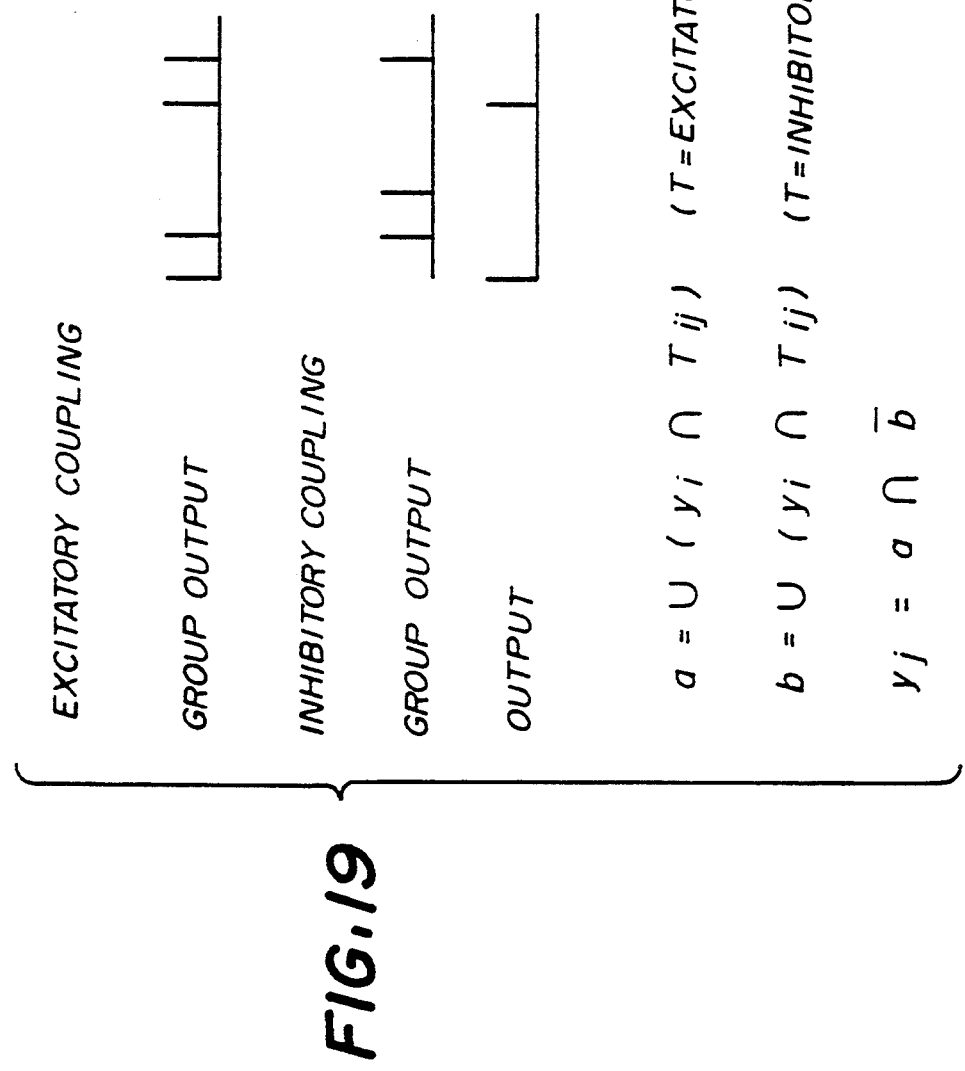
FIGS. 19 and 20 are diagrams for explaining outputs of excitatory and inhibitory groups.

In this structure, the neuron unit 50 outputs "1" only when the output of the excitatory group is "1" and the output of the inhibitory group is "0". This may be achieved by obtaining an AND of a NOT of the output of the inhibitory group and the output of the excitatory group as shown in FIG. 19. Hence, the output a of the excitatory group can be described as $a= \cup(y_i \cap T_{ij})$ and the output b of the inhibitory group can be described by $b= \cup(y_i \cap T_{ij})$. In addition, the output $y_j$ of the neuron unit 50 can be described by $y_j = a \cap \bar{b}$. The neural network can be formed by connecting a plurality of such neuron units 50 in a plurality of layers to form a hierarchical structure similarly as in the case of the neural network shown in FIG. 14. When the entire neural network is synchronized, it is possible to carry out the above described calculation in each layer.

Figure 20:
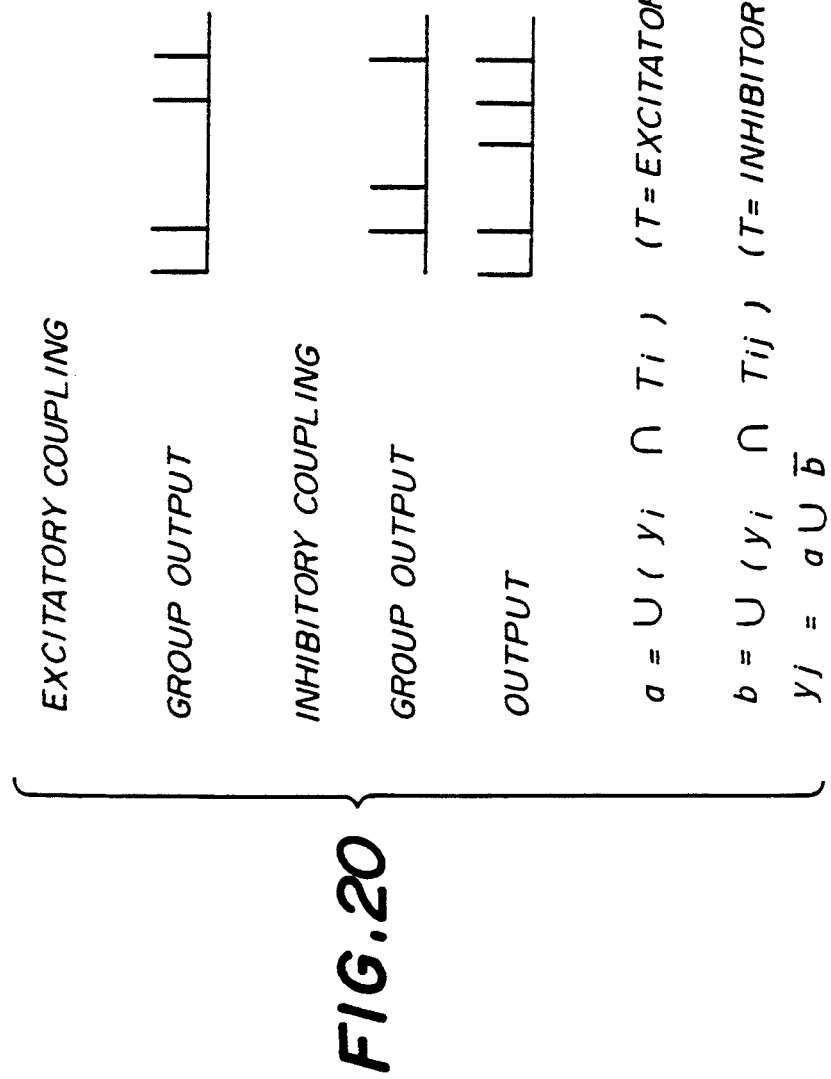

On the other hand, measures may be taken so that the neuron unit 50 outputs "1" excluding the case where the output of the excitatory group is "0" and the output of the inhibitory group is "1". This may be achieved by obtaining an OR of a NOT of the output of the inhibitory group and the output of the excitatory group as shown in FIG. 20. Hence, the output a of the excitatory group can be described as $a= \cup(y_i \cap T_{ij})$ and the output b of the inhibitory group can be described by $b= \cup(y_i \cap T_{ij})$. In addition, the output $y_j$ of the neuron unit 50 can be described by $y_j = a \cup \bar{b}$.

Next, a description will be given of the learning process.

Figure 21:
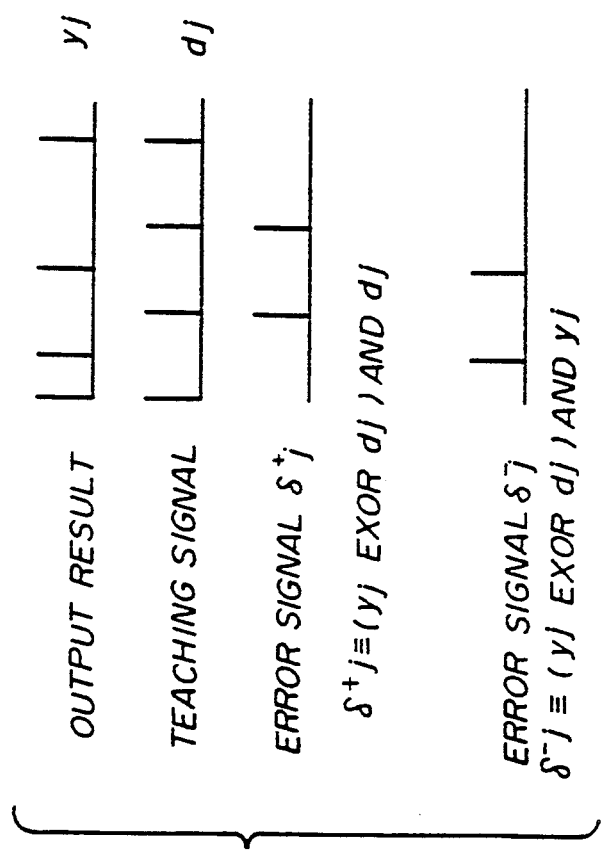
FIG. 21 is a diagram for explaining an error signal.

The Error Signal in the Final Layer:

The error signal of each neuron unit 50 in the final layer is calculated, and the weight function of each neuron unit 50 is varied depending on the error signal. A description will now be given of the method of calculating the error signal. In this structure, the error signal is defined as follows. That is, the error may take a positive or negative value when the error is described by a numerical value, but in the case of the pulse density, it is impossible to simultaneously describe the positive and negative values. Hence, two kinds of signals, namely, a signal which indicates a positive component and a signal which indicates a negative component are used to describe the error signal. In other words, an error signal $\delta^+j$ or $\delta^-j$ of the jth neuron unit 50 can be described as follows, where $\delta^+j$ denotes the positive error signal, $\delta^-j$ denotes the negative error signal, and the output signal $y_j$ and the teaching signal $d_j$ of the jth neuron unit 50 are as shown in FIG. 21.

$$\delta^+j = (y_j \text{ EXOR } d_j) \text{ AND } d_j$$

$$\delta^-j = (y_j \text{ EXOR } d_j) \text{ AND } y_j$$

Therefore, the positive component of the error signal corresponds to the pulses existing on the teaching signal side out of the parts (1, 0) and (0, 1) where the teaching signal pulse and the output signal pulse differ. Similarly, the negative component of the error signal corresponds to the pulses existing on the output signal side out of the parts (1, 0) and (0, 1) where the teaching signal pulse and the output signal pulse differ. In other words, when the positive component of the error signal is added to the output signal and the negative component of the error signal is subtracted, the teaching signal is obtained. As will be described later, the weight function is varied based on such error signal pulses.

The Error Signal in the Intermediate Layer:

The error signal is back propagated, so that not only the weight functions of the final layer and the immediately preceding layer but also the weight functions of the layer which precedes the above immediately preceding layer are varied. For this reason, there is a need to calculate the error signal for each neuron unit 50 in the intermediate layer. The error signals from each of the neuron units 50 in the next layer are collected and used as the error signal of a certain neuron unit 50 of the intermediately layer, substantially in the reverse manner as supplying the output signal of the certain neuron unit 50 to each of the neuron units in the next layer. This may be achieved similarly as described above with reference to the equation (7) and FIGS. 21 through 23. That is, the couplings are divided into two groups depending on whether the coupling is an excitatory coupling or an inhibitory coupling, and the multiplication part is described by AND and the $\Sigma$ part is described by OR. The only difference in this case is that although y is a single signal $\delta$ may be positive or negative and thus two error signals must be considered. Therefore, four cases must be considered depending on whether the weight function T is positive or negative and whether the error signal $\delta$ is positive or negative.

First, a description will be given of the excitatory coupling. In this case, $\delta^+k \cap T_{ij}$ which is an AND of the positive error signal $\delta^+k$ of the kth neuron unit in the layer next to a specific layer and the weight function $T_{jk}$ between the jth neuron unit in the specific layer and the kth neuron unit in the next layer is obtained for each neuron unit in the specific layer. Furthermore, $\cup(\delta^+k \cap T_{jk})$ which is an OR of $\delta^+k \cap T_{jk}$ obtained for each neuron unit in the specific layer, and this OR is regarded as the positive error signal $+j$ for the specific layer as shown in FIG. 22.

In addition, $\delta^-k \cap T_{jk}$ which is an AND of the negative error signal $\delta^-k$ of the kth neuron unit in the next layer and the weight function $T_{jk}$ between the jth neuron unit in the specific layer and the kth neuron unit in the next layer is obtained for each neuron unit in the specific layer. Furthermore, $\cup(\delta^-k \cap T_{jk})$ which is an OR of $\delta^-k \cap T_{jk}$ obtained for each neuron unit in the specific layer, and this OR is regarded as the negative error signal $\delta^-j$ for the specific layer as shown in FIG. 23.

Next, a description will be given of the inhibitory coupling. In this case, $\delta^-k \cap T_{jk}$ which is an AND of the negative error signal $\delta^-k$ of the kth neuron unit in the layer next to a specific layer and the weight function $T_{jk}$ between the jth neuron unit in the specific layer and the kth neuron unit in the next layer is obtained for each neuron unit in the specific layer. Furthermore, $\cup(\delta^-k \cap T_{jk})$ which is an OR of $\delta^-k \cap T_{jk}$ obtained for each neuron unit in the specific layer, and this OR is regarded as the positive error signal $\delta^+j$ for the specific layer as shown in FIG. 24.

In addition, $\delta^+k \cap T_{jk}$ which is an AND of the positive error signal $\delta^+k$ of the kth neuron unit in the next layer and the weight function $T_{jk}$ between the jth neuron unit in the specific layer and the kth neuron unit in the next layer is obtained for each neuron unit in the specific layer. Furthermore, $\cup(\delta^+k \cap T_{jk})$ which is an OR of $\delta^+k \cap T_{jk}$ obtained for each neuron unit in the specific layer, and this OR is regarded as the negative error signal $\delta^-j$ for the specific layer as shown in FIG. 25.

Since one neuron unit may be coupled to another neuron unit by an excitatory or inhibitory coupling, an OR of the error signal $\delta^+j$ shown in FIG. 22 and the error signal $\delta^+j$ shown in FIG. 24 is regarded as the error signal $\delta^+j$ of the jth neuron unit. Similarly, an OR of the error signal $\delta^-j$ shown in FIG. 23 and the error signal $\delta^-j$ shown in FIG. 25 is regarded as the error signal $\delta^-j$ of the jth neuron unit.

Therefore, the error signals $\delta^+j$ and $\delta^-j$ of the jth neuron unit in the specific layer can be described as follows.

$$\delta^+j = [\cup(\delta^+k \cap T_{jk})] \cup [\cup(\delta^-k \cap T_{jk})]$$
$$k \in \text{excitatory} \qquad k \in \text{inhibitory}$$

$$\delta^-j = [\cup(\delta^-k \cap T_{jk})] \cup [\cup(^+k \cap T_{jk})]$$
$$k \in \text{excitatory} \qquad k \in \text{inhibitory}$$

The error signals $\delta^+j$ and $\delta^-j$ can also be described as follows.

$$\delta^+j = \cup E^+_{jk}$$

where $$E^+_{jk} = \delta^+k \cap T_{jk} \ (T_{jk} = \text{excitatory})$$
$$= \delta^-k \cap T_{jk} \ (T_{jk} = \text{inhibitory})$$

$$\delta^-j = \cup E^-_{jk}$$

where $$E^-_{jk} = \delta^-k \cap T_{jk} \ (T_{jk} = \text{inhibitory})$$
$$= \delta^+k \cap T_{jk} \ (T_{jk} = \text{excitatory})$$

It is possible to further provide a function corresponding to the learning rate (learning constant). When the rate is "1" or less in numerical calculation, the learning capability is improved. This may be realized by thinning out the pulse train in the case of an operation on pulse trains. Two examples will now be described where the example 1) thins out every other pulses of the original pulse signal in which the pulses are equi-distant from each other and the example 2) thins out every other pulse of the original pulse signal in which the pulses are not equi-distant from each other.

FIG. 26 shows the example 1) for $\eta = 0.5$ where every other pulse of the original pulse signal are thinned out, $\eta = 0.33$ where every third pulse of the original pulse signal are thinned out, and $\eta = 0.67$ where every third pulses of the original pulse signal are thinned out.

FIG. 27 shows the example 2) for $\eta = 0.5$ where every other pulse of the original pulse signal are thinned out, $\eta = 0.33$ where every third pulse of the original pulse signal are thinned out, and $\eta = 0.67$ where every third pulse of the original pulse signal are thinned out.

By thinning out the error signal in the above described manner, it is possible to provide the function corresponding to the learning rate. Such thinning out can easily be realized by use of a generally available counter and/or flip-flop by carrying out a logic operation on a counter output, for example. In a particular case where the counter is used, it is possible to easily set the value of the learning constant $\eta$ to an arbitrary value, thereby making it possible to control the characteristic of the neural network.

It is not essential to always use the learning constant for the error signal. For example, it is possible to use the learning constant may be used only when carrying out the operation to obtain the weight function. In addition, the learning constant at the time of back-propagating the error signal and the learning constant at the time of carrying out the operation to obtain the weight function may be different. This means that the characteristics of the neuron units in the neural network can be set independently, and it is thus possible to form a system which is easily applicable to general applications. Accordingly, it becomes possible to appropriately adjust the performance the neural network.

Variation of Each Weighting Coefficient by the Error Signal:

The error signal is obtained by the method described above, and each weight function is varied. The method of varying each weight function will now be described. First, an AND is obtained between the error signal and the signal flowing in a line to which the weight function which is to be varied belongs. In other words, $\delta \cap y$ is obtained. But since there are two error signals, one positive and one negative, both $\delta^+j \cap y_i$ and $\delta^-j \cap y_i$ are obtained as shown respectively in FIGS. 28 and 29. The two signals which are obtained from $\delta^+j \cap y_i$ and $\delta^-j \cap y_i$ are respectively denoted by $\Delta T^+_{ij}$ and $\Delta T^-_{ij}$.

Next, a new weight function $T_{ij}$ is obtained based on $\Delta T_{ij}$. But since the weight function $T_{ij}$ in this structure is an absolute value component, the new weight function $T_{ij}$ is obtained differently depending on whether the original weight function $T_{ij}$ is excitatory or inhibitory. When the original weight function $T_{ij}$ is excitatory, the component of $\Delta T^+_{ij}$ is increased with respect to the original weight function $T_{ij}$ and the component of $\Delta T^-_{ij}$ is decreased with respect to the original weight function $T_{ij}$ as shown in FIG. 30. On the other hand, when the original weight function $T_{ij}$ is inhibitory, the component of $\Delta T^+_{ij}$ is decreased with respect to the original weight function $T_{ij}$ and the component of $\Delta T^-_{ij}$ is increased with respect to the original weight function $T_{ij}$ as shown in FIG. 31.

The calculations in the neural network are carried out based on the above described learning rules.

Figure 32:
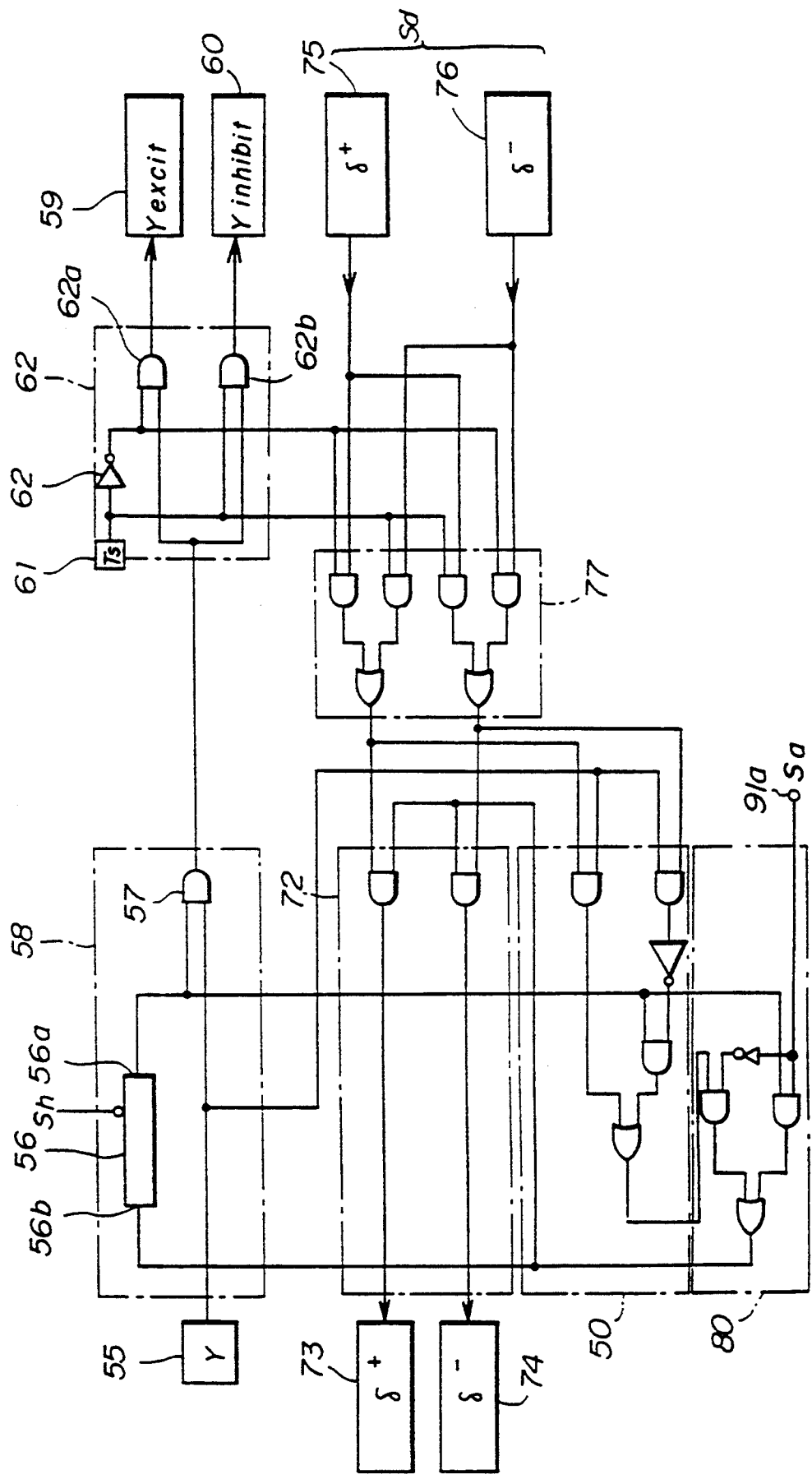
FIG. 32 is a circuit diagram showing a circuit which corresponds to a connection line between two neuron units in the neural network shown in FIG. 14.
Figure 33:
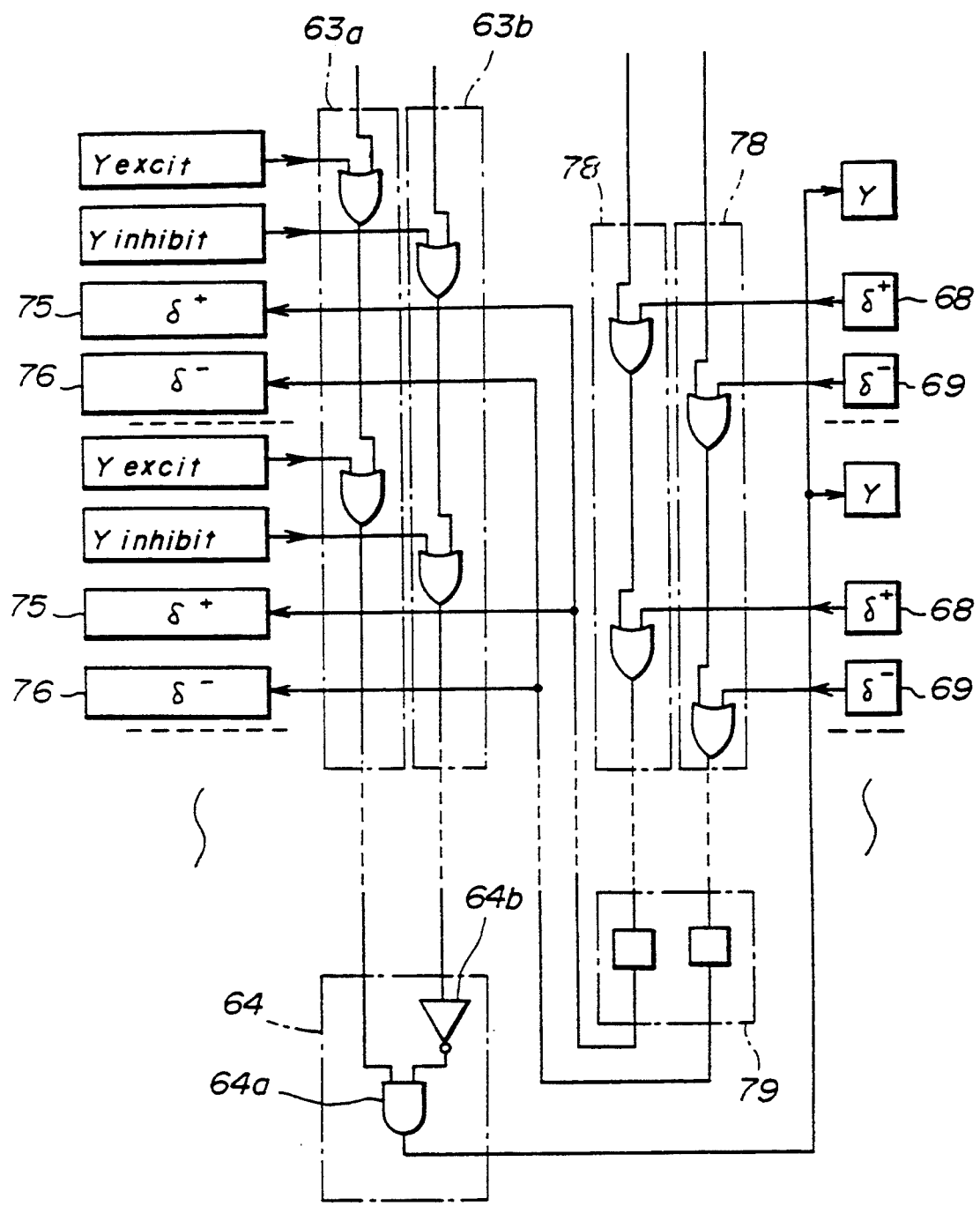
FIG. 33 is a circuit diagram showing a circuit which corresponds to the neuron unit of the first structure of the neuron unit.
Figure 34:
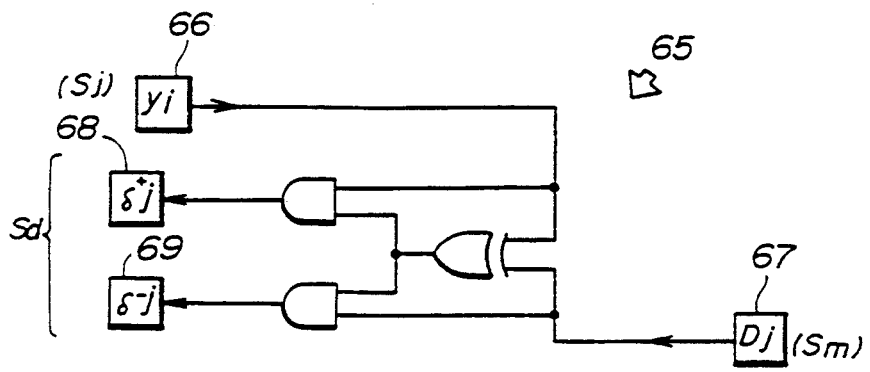
FIG. 34 is a circuit diagram showing a circuit for obtaining an error signal in a final layer of the neural network based on an output of the final layer and a teaching signal.

Next, a description will be given of actual circuits which form the digital circuit, by referring to FIGS. 32 through 34. FIG. 32 shows a circuit which corresponds to a connection line between two neuron units in the neural network shown in FIG. 14. FIG. 33 shows a circuit which corresponds to the neuron unit 50. FIG. 34 shows a circuit for obtaining the error signal in the final layer based on the output of the final layer and the teaching signal. The circuits shown in FIGS. 32 through 34 are connected as shown in FIG. 14 to form the digital neural network having the self-learning function.

In FIG. 32, an input signal 55 to the neuron unit 50 corresponds to the input signal described with reference to FIG. 15. The value of the weight function described with reference to FIG. 16 is stored in a shift register 56. The shift register 56 has an input 56b and an output 56a and has a function similar to a general shift register. For example, a combination of a random access memory (RAM) and an address controller may be used as the shift register 56.

A logic circuit 58 which includes an AND circuit 57 and corresponds to $y_i \cap T_{ij}$ described with reference to FIG. 17 obtains an AND of the input signal 55 and the weight function within the shift register 56. An output signal of the logic circuit 58 must be grouped depending on whether the coupling is excitatory or inhibitory, but it is preferable from the point of general application to prepare an output 59 for the excitatory group and an output 60 for the inhibitory group and output one of these outputs 59 and 60. For this reason, this structure has a memory 61 for storing a bit which indicates whether the coupling is excitatory or inhibitory, and a switching gate circuit 62 is switched depending on the bit which is stored in the memory 61. The switching gate circuit 62 includes two AND gates 62a and 62b and an inverter 62c which inverts the bit which is read out from the memory 61 and is supplied to the AND gate 62a. The aforementioned signal Sk functions as a write enable signal $\overline{WE}$, and the content of the register 56 is updated by using the error signal Sd in response to the write enable signal.

In addition, as shown in FIG. 33, gate circuits 63a and 63b which include a plurality of OR gates and correspond to $\cup(y_i \cap T_{ij})$ and described with reference to FIG. 18 are provided to process each input. A gate circuit 64 includes an AND gate 64a and an inverter 64b and outputs an output signal "1" only when the output of the excitatory group is "1" and the output of the inhibitory group is "0", as described in conjunction with FIG. 19.

Next, a description will be given of the error signal. A logic circuit 65 shown in FIG. 34 includes two AND gates and one exclusive-OR gate and generates error signals in the final layer. This logic circuit 65 corresponds to the equations described with reference to FIG. 21. In other words, the logic circuit 65 generates error signals 68 and 69 based on an output signal 66 (yi is the same as Sj) of the final layer and a teaching signal 67 (Dj is the samd as Sm). The calculation of the error signals in the intermediate layer described with reference to FIGS. 22 through 25 is carried out by a gate circuit 72 shown in FIG. 32 which includes two AND gates. The gate circuit 72 outputs output signals 73 and 74 depending on positive and negative signals 75 and 76 of the error signals 68 and 69.

The calculation is carried out for two cases, that is, for the case where the coupling is excitatory and the case where the coupling is inhibitory. A gate circuit 77 which includes four AND gates and two OR gates determines which one of the cases the calculation is to be carried out based on the bit stored in the memory 61 and the positive and negative signals 75 and 76.

A gate circuit 78 which includes OR gates as shown in FIG. 33 carries out the calculations according to the equations described above to obtain the error signals $\delta^+j$ and $\delta^-j$. Furthermore, the calculation to obtain the learning rate as described in conjunction with FIGS. 26 and 27 is carried out by a frequency dividing circuit 79 shown in FIG. 33. Finally, a gate circuit 80 which includes three AND gates, an OR gate and an inverter as shown in FIG. 32 calculates the new weight function from the error signal as described in conjunction with FIGS. 28 through 31. The content of the shift register 56, that is, the weight function, is rewritten into the new weight function which is calculated by the gate circuit 80. The gate circuit 80 also carries out the calculation for the case where the coupling is excitatory and the case where the coupling is inhibitory, and one of these two cases is determined by the gate circuit 77.

Figure 35:
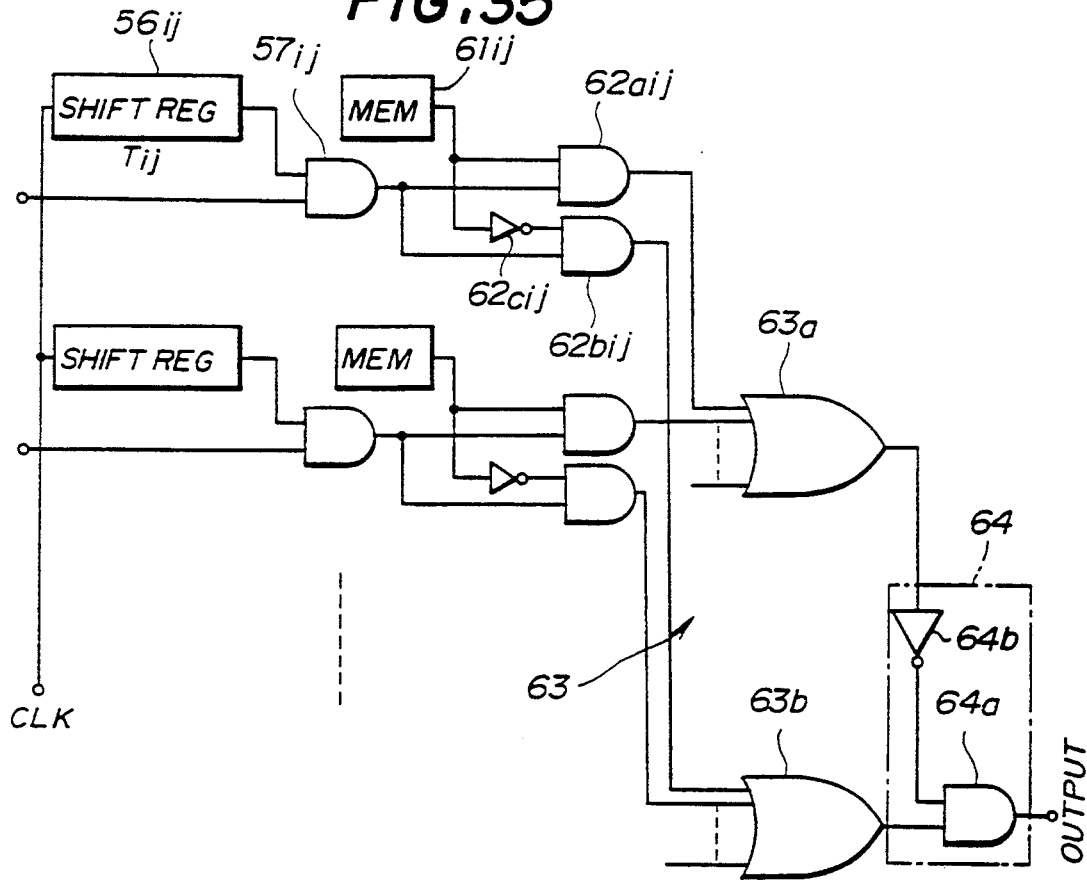
FIG. 35 is a circuit diagram showing an embodiment of a circuit for grouping excitatory and inhibitory couplings and determining the output in FIGS. 32 and 33.

FIG. 35 shows an embodiment of the grouping system and the output determination system shown in FIGS. 32 and 33. In this case, the grouping is not made at the input stage. A shift register $56_{ij}$ which stores the weight function is provided with respect to each input signal $55_{ij}$. An output signal of each AND gate $57_{ij}$ is grouped into one of excitatory and inhibitory groups via the switching gate circuit 62 depending on the content of a memory $61_{ij}$. A logical sum is obtained in the OR gate 63a for the excitatory group (excitatory coupling) and a logical sum is obtained in the OR gate 63b for the inhibitory group (inhibitory coupling). Thereafter, the output signal is determined by a logical product processing in the gate circuit 64.

Figure 36:
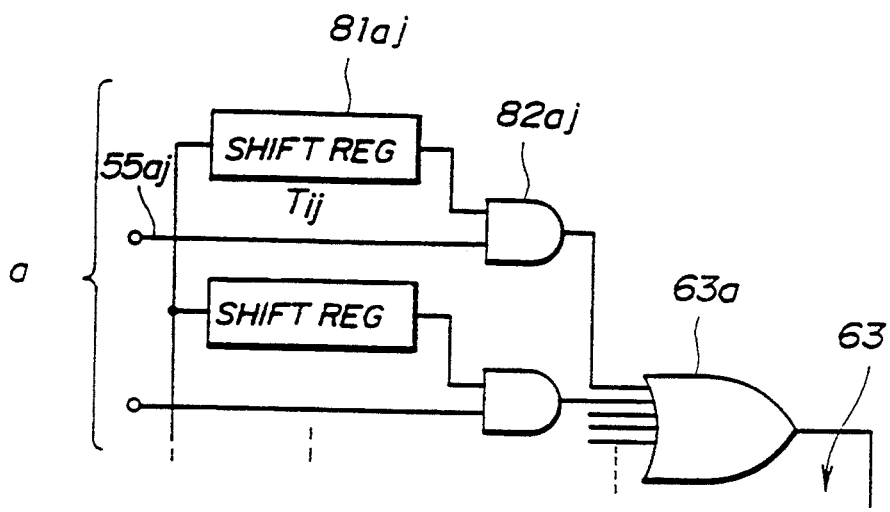
FIG. 36 is a circuit diagram showing another embodiment of the circuit for grouping excitatory and inhibitory coupling and determining the output.
Figure 36:
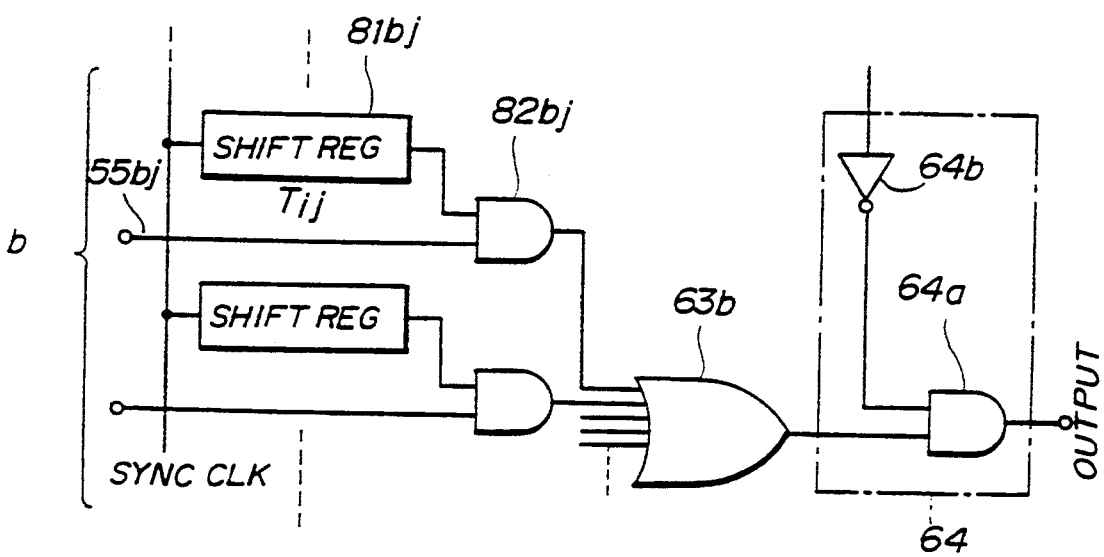

FIG. 36 shows an embodiment of the grouping system and the output determination system shown in FIGS. 32 and 33. In this case, the grouping is made at the input stage, and the couplings are grouped into an excitatory coupling group a and an inhibitory coupling group b. A shift register 81 has at least two bits and stores the weighting (coupling) coefficient $T_{ij}$ with respect to each input signal $55_{ij}$. The output signals of the group a is supplied to the OR gate 63a, while the output signals of the group b are supplied to the OR gate 63b. The output signals of the OR gates 63a and 63b are processed similarly as in the case of the structure shown in FIG. 35 in the gate circuit 64.

Figure 37:
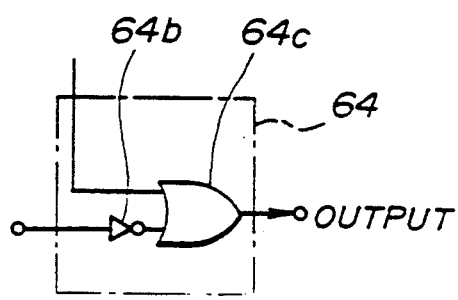
FIG. 37 is a circuit diagram showing a modification of a gate circuit shown in FIGS. 34 and 35.

FIG. 37 shows a modification of the gate circuit 64 shown in FIGS. 35 and 36. This modification of the gate circuit 64 uses an OR gate 64c in place of the AND gate 64a and obtains a logical sum. This process of the gate circuit 64 shown in FIG. 37 corresponds to the process described with reference to FIG. 20.

The circuit for grouping the couplings into the excitatory group and the inhibitory group and determining the output is further disclosed in a U.S. patent application Ser. No. 550,404 filed Jul. 10, 1990, the disclosure of which is hereby incorporated by reference.

Next, a description will be given of a second structure of the neuron unit according to the present invention, by referring to FIG. 48. The second structure further includes learning constant setting means 82 for arbitrarily and variably setting the learning constant which is used in the weight function varying circuit from the outside. In other words, in addition to the fundamental rules [1] through [6] described above, the neuron unit is realized by use of digital circuits according to the following additional rule [7A].

[7A] The learning constant (learning rate) which is used during the learning process of [6] made variable, so as to enable general applications of the neural network.

The learning constant setting means 82 is provided in place of the frequency dividing circuit 79 shown in FIG. 33. The learning constant setting means 82 includes a counter 83 which receives the error signal, OR gates 84 through 87 for carrying out a logic operation on outputs of the counter 83 so as to process the learning constant, switches Sa through Sd which are respectively connected to the OR gates 84 through 87, and an AND gate 88 which receives outputs of the OR gates 84 through 87. $\eta = 1.0$ when the switches Sa through Sd are connected to the high-level side, and $\eta = 1/16$ when the switches Sa through Sd are connected to the not-high-level side. When the number of switches connected to the high-level side is denoted by N, $\eta = 2^N/16$. Accordingly, the learning constant can be set arbitrarily by use of the switches Sa through Sd or external signals which replace the switches Sa through Sd.

Figure 38:
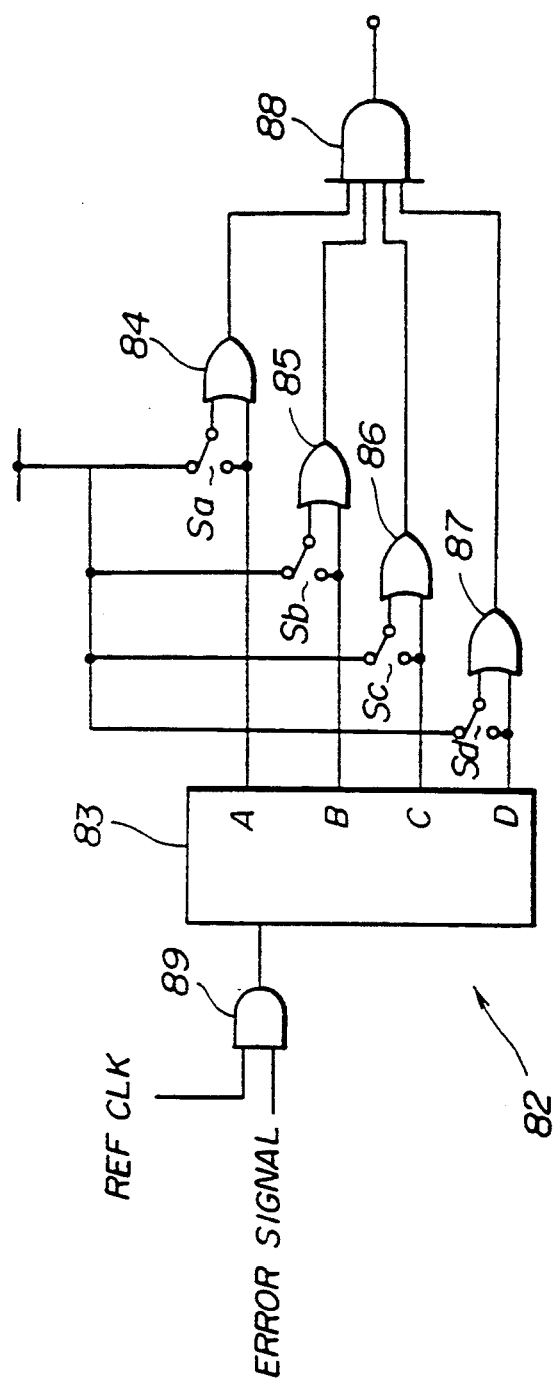
FIG. 38 is a circuit diagram showing an essential part of a second structure of the neuron unit used in the present invention.

When the pulse density is used as the clock input to the counter 83, it is possible to provide an AND gate 89 with respect to the error signal input as shown in FIG. 38. The learning constant setting means 82 is of course not limited to that shown in FIG. 38, and in addition, it is possible to provide a plurality of learning constant setting means 82. Furthermore, it is possible to appropriately controlling the learning constant setting means 82 by external signals, it is also possible to make the value of the learning constant which is used for the operation on the weight function different from the value of the learning constant which is used for the back propagation of the error signal.

Next, a description will be given of a third structure of the neuron unit according to the present invention, by referring to FIGS. 39 through 41. In addition to the fundamental rules [1] through [6] described above, this structure realizes the neuron unit by use of digital circuits according to the following additional rule [7B].

[7B] Two kinds of weight functions, that is, an excitatory weight function and an inhibitory weight function are prepared, and the flexibility of the neural network is improved by determining the result of the operation on the input signal depending on the majority of the kind of weight functions used In other words, one neuron unit has the excitatory weight function and the inhibitory weight function, and the resulting output which is obtained by an AND of the input signal and the weight function is processed depending on the ratio of the existing excitatory couplings and inhibitory couplings. This ratio of the existing excitatory couplings and inhibitory couplings means the following. That is, with respect to the plurality of input signals which are subjected to an operation in synchronism, the number of times the resulting output obtained by use of the excitatory weight function is "1" is compared with the number of times the resulting output obtained by use of the inhibitory weight function is "1", and the neuron unit outputs "0" when the latter is greater and otherwise outputs "1". Alternatively, the neuron unit may output "0" when the two as the same.

Figure 39:
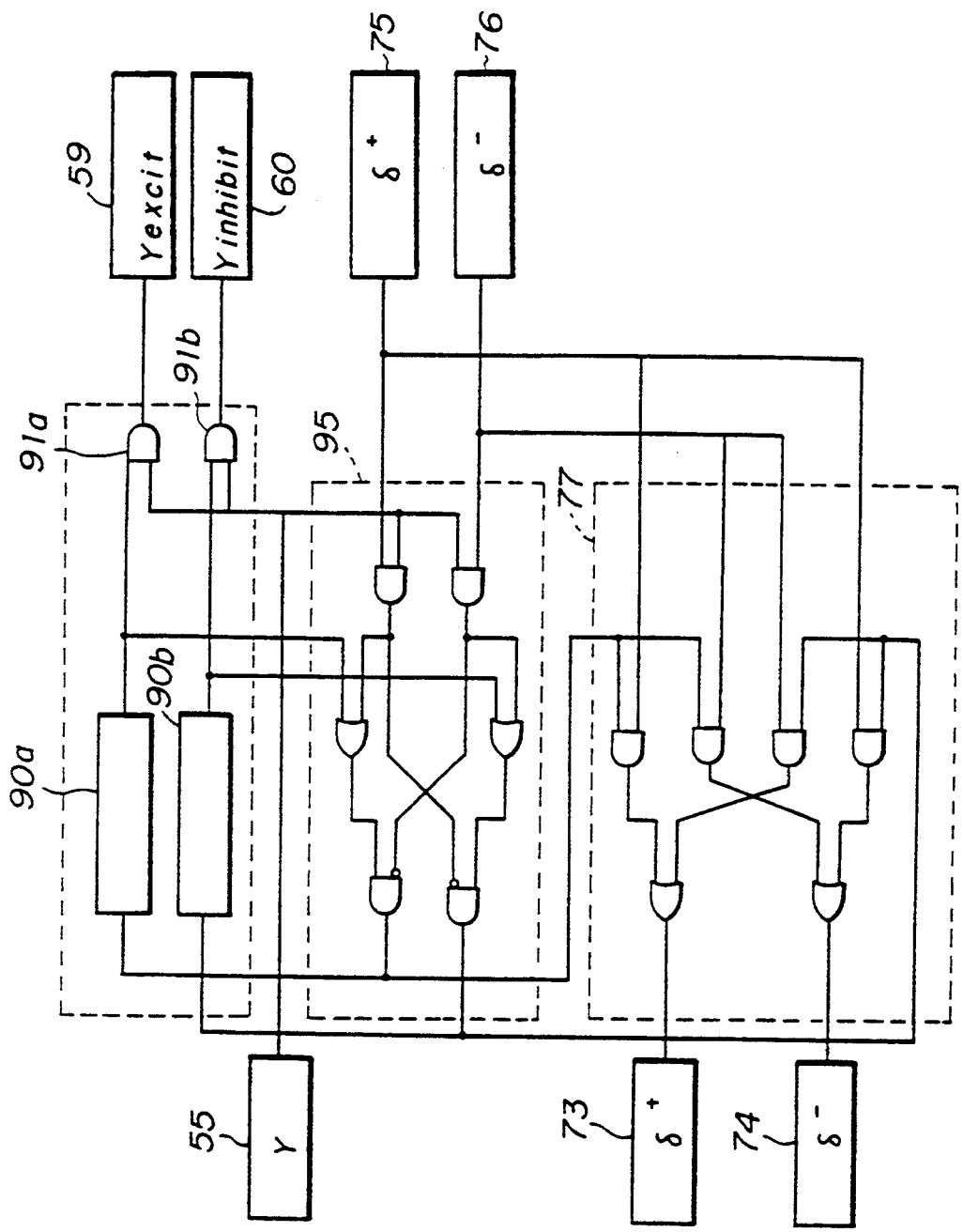
FIGS. 39 through 41 are circuit diagrams for explaining essential parts of a third structure of the neuron unit used in the present invention.
Figure 40:
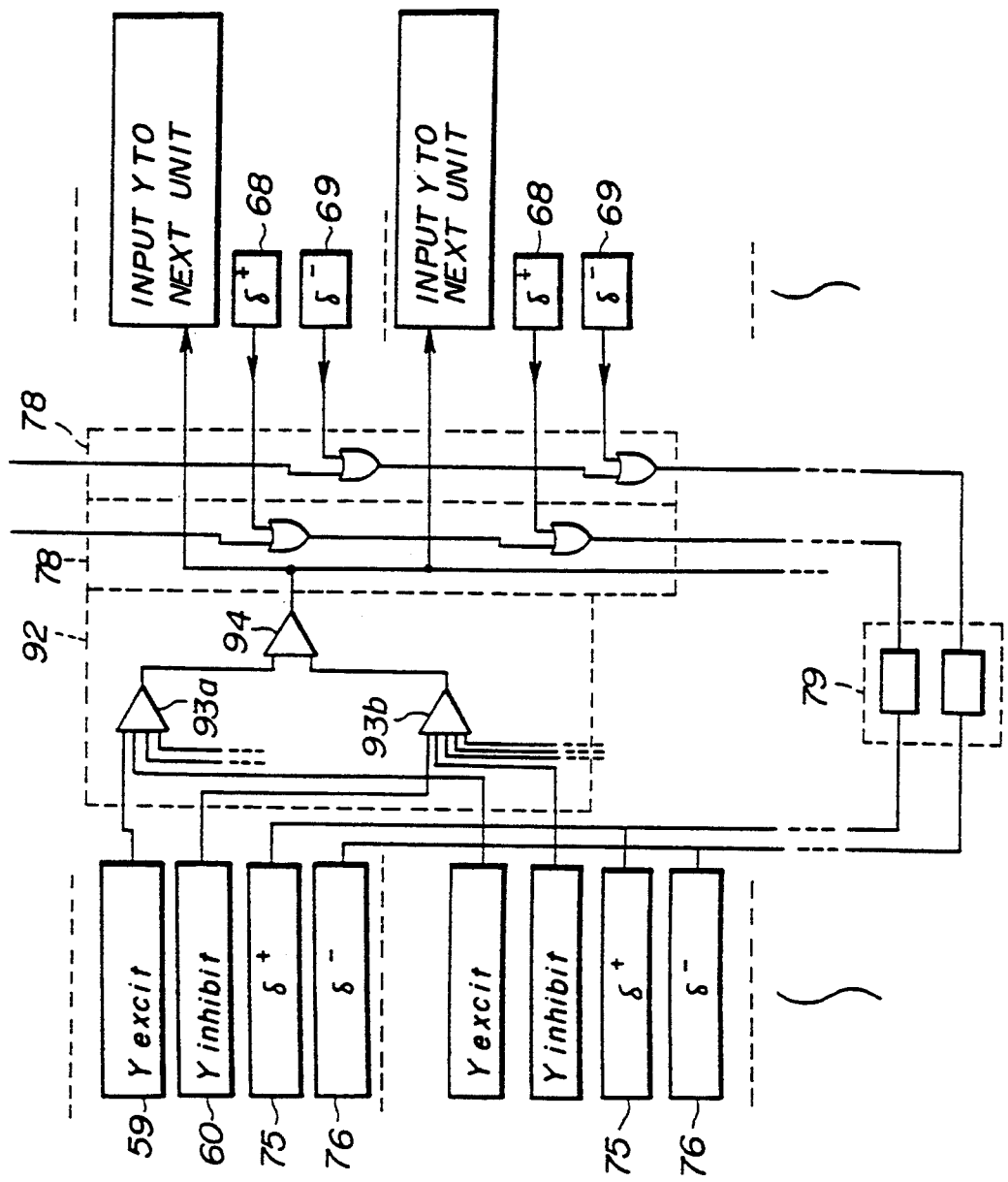

FIGS. 39 and 40 show circuits for realizing the above. First, a pair of shift registers 90a and 90b are provided with respect to each input signal 55. One of the shift registers 90a and 90b stores the excitatory weight function while the other stores the inhibitory weight function. These shift registers 90a and 90b may have the same construction as the shift register 56. The contents of the shift registers 90a and 90b are successively read out by a reading means (not shown) and supplied to corresponding AND gates 91a and 91b together with the input signal 55. A known reading means may be used.

Output signals 59 and 60 of the AND gates 91a and 91b are supplied to a majority determination circuit 92 shown in FIG. 40. The digital signals including the signal 59 which are obtained by using the excitatory weight functions stored in the shift registers 90a are supplied to an amplifier 93a and subjected to an adding process. Similarly, the digital signals including the signal 60 which are obtained by using the inhibitory weight functions stored in the shift registers 90b are supplied to an amplifier 93b and subjected to an adding process. Outputs of the amplifiers 93a and 93b are compared in a comparator 94 which determines the majority. Of course, the majority determination circuit 92 is not limited to that shown in FIG. 40, and any kind of majority determination circuit may be used.

Figure 41:
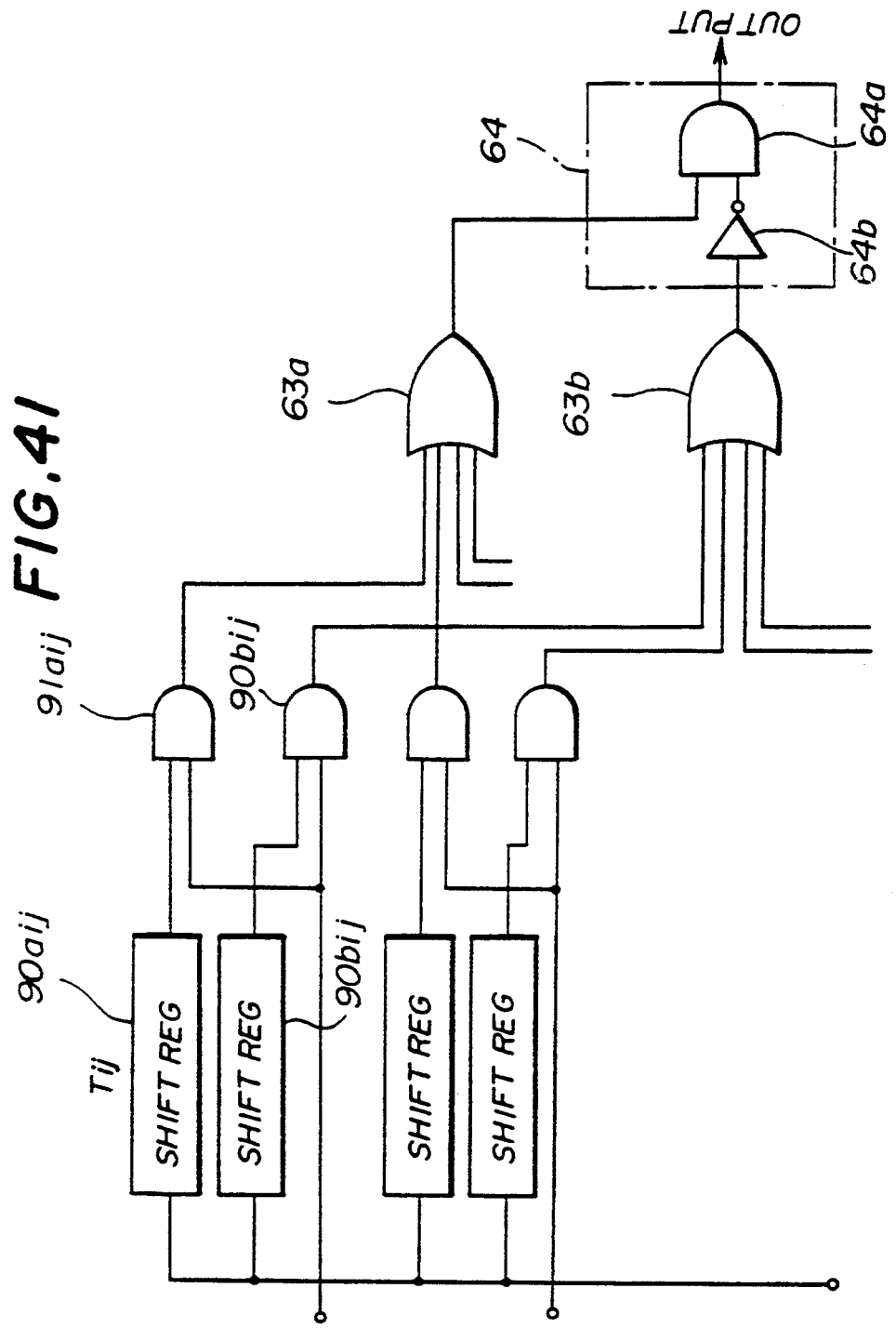

FIG. 41 shows the circuit for grouping the circuit shown in FIG. 39. A pair of shift registers (memories) for storing the excitatory and inhibitory weight functions with respect to each input signal are provided, and the logical product is obtained for each group of shift registers.

In FIG. 41, OR gates 63a and 63b are provided in place of the majority determination circuit 92, similarly as in the circuits shown in FIGS. 35 and 36. The gate circuit 64 may have the construction shown in FIG. 37.

In this embodiment, the pair of shift registers 90a and 90b is provided for each input signal 55. Hence, the rewriting of the weight function using the self-learning function is carried out for each of the shift registers 90a and 90b. For this reason, a self-learning circuit 95 is provided as shown in FIG. 39 to calculate the new weight function as described in conjunction with FIGS. 23 through 25 and the equations for obtaining the error signals $\delta^+ j$ and $\delta^- j$. This self-learning circuit 95 is connected to the input side of the shift registers 90a and 90b.

According to this embodiment, the coupling of the neuron units is not limited to only the excitatory coupling or the inhibitory coupling. As a result, the neural network has more flexibility and is applicable to general applications.

The frequency dividing circuit 79 show in FIG. 40 may also be replaced by a learning constant setting means such as the learning constant setting means 82 shown in FIG. 38.

In addition, the method of determining the output by the majority determination circuit 92 is not limited to that shown in FIG. 39 in which two memories (shift registers 90a and 90b) are provided with respect to each input signal. For example, this method may be applied similarly to a case where one memory 56 is provided with respect to each input signal. In other words, in addition to the combination of FIGS. 32 and 33, it is also possible to combine FIGS. 32 and 40.

The neuron circuits shown in FIGS. 32 through 41 can be used to form a neuron unit or a neural network, but the entire circuit need not be formed solely of hardware. In the present invention, the functions of the neuron units forming the neural network may be realized by software. In the case of the neural network shown in FIG. 14, the signal processing is carried out by software in an arbitrary neuron unit of the neural network. The signal processing may be carried out by software in one or more neuron units, all of the neuron units, or selected neuron units determined for each layer of the neural network.

Figure 42:
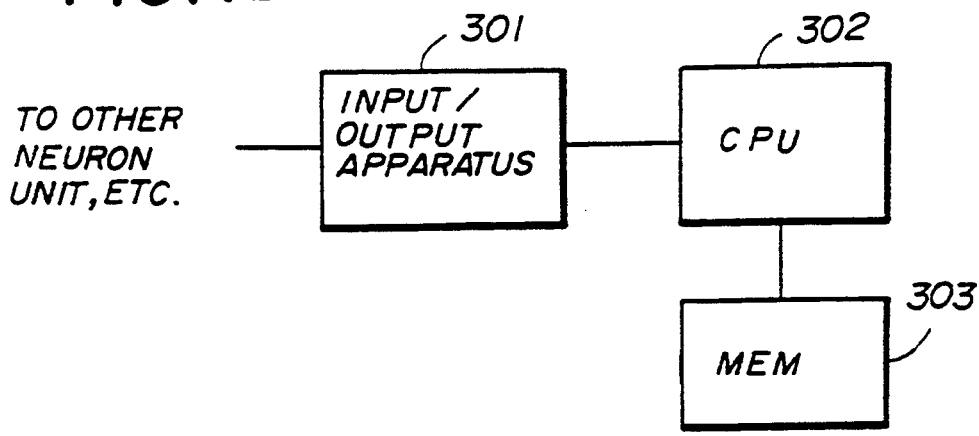
FIG. 42 is a block diagram showing a computer system which realizes the neural network by software.

FIG. 42 shows the neuron unit which carries out the signal processing by software. In FIG. 42, an input/output apparatus 301 is coupled to a neuron unit which uses a neuron circuit or an apparatus for inputting/outputting signals from/to the neural network. A memory 303 stores data and programs (software) for controlling a central processing unit (CPU) 302, and the signals are processed in the CPU 302. The signal processing procedure is as described above. The software is made according to the procedures shown in FIGS. 43 and 44 and stored in the memory 303.

One neuron unit shown in FIG. 42 may function as a plurality of neuron units depending on the software. In this case, it is necessary to process the signals in time division.

According to this embodiment, the network structure can be modified by simply changing the memory 303 (or changing the contents of the memory 303) without the need to modify the hardware. As a result, the network structure becomes flexible and suited for general applications.

Figure 43:
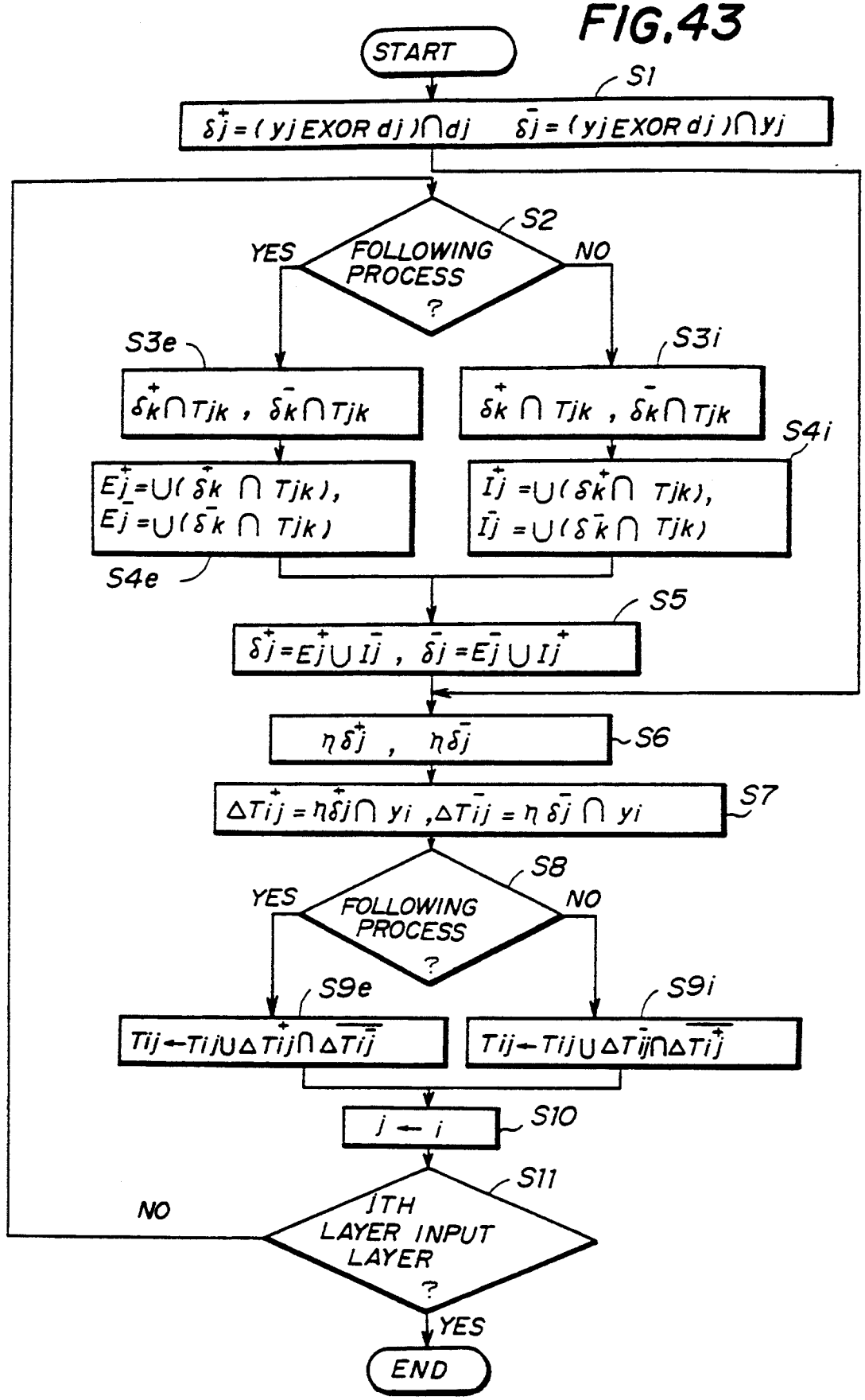
FIG. 43 is a flowchart of a learning process of a CPU shown in FIG. 42.

FIG. 43 is a flow chart for explaining the learning process of the CPU 302. In FIG. 43, a step S1 generates the error signals $^+j=(y_j \text{EXOR } d_j \text{AND } d_j)$ and $^-j=(y_j \text{EXOR } d_j)\text{AND } y_j$ between the output signal $y_j$ and the teaching signal $d_j$ as described in conjunction with FIG. 21. A step S2 judges the following processes to be calculated depending on the sign of the weight function which is excitatory or inhibitory. Steps S3e and S4e are then carried out in the case where the coupling between the jth layer and the next kth layer is excitatory. On the other hand, steps S3i and S4i are carried out in the case where the coupling between the jth layer and the next kth layer is inhibitory.

The step S3e obtains an AND between the weight function $T_{jk}$ and the error signal $\delta^+k$, and an AND between the weight function $T_{jk}$ and the error signal $\delta^-k$. The step S4e obtains $E^+j = \cup(\delta^+k \cap T_{jk})$ which is an OR of all of $\delta^+k \cap T_{jk}$ obtained in the step S3e. In addition, the step S4e obtains $E^-j = \cup(\delta^-k \cap T_{jk})$ which is an OR of all of $\delta^-k \cap T_{jk}$ obtained in the step S3e.

Similarly, the step S3i obtains an AND between the weight function $T_{jk}$ and the error signal $\delta^+k$, and an AND between the weight function $T_{jk}$ and the error signal $\delta^-k$. The step S4i obtains $I^+jk = \cup(\delta^+k \cap T_{jk})$ which is an OR of all of $\delta^+k \cap T_{jk}$ obtained in the step S3i. In addition, the step S4i obtains $I^-j = \cup(-k \cap T_{jk})$ which is an OR of all of $\delta^-k \cap T_{jk}$ obtained in the step S3i.

A step S5 obtains $\delta^+j = E^+j \cup I^-j$ which is an OR of $E^+j$ and $I^-j$. In addition, the step S5 obtains $\delta^-j = E^-j \cup I^+j$ which is an OR Of $E^-j$ and $I^+j$. A step S6 thins out the pulse trains of the error signals $\delta^+j$ and $\delta^-j$ and obtains $\eta\delta^+j$ and $\eta\delta^-j$. A step S7 obtains an AND of the input signal $y_i$ and the thinned out error signals $\eta\delta^+j$ and $\eta\delta^-j$. That is, the step S7 obtains $\Delta T^+ij = \eta\delta^+j \cap y_i$ and $\Delta T^-ij = \eta\delta^-j \cap y_i$. A step S8 judges the following processes to be calculated depending on the sign of the weight function which is excitatory or inhibitory.

Then, a step S9e is carried out in the case of the excitatory coupling and a step S9i is carried out in the case of the inhibitory coupling. The step S9e renews the weight function $T_{ij}$ by obtaining $T_{ij} \cap \overline{\Delta T^-ij} \cup \Delta T^+ij$. On the other hand, the step S9i renews the weight function $T_{ij}$ by obtaining $T_{ij} \cap \overline{\Delta T^+ij} \cup \Delta T^-ij$.

A step S10 changes j to i in accordance with the backward process In this case, j is decremented to i. A step S11 thereafter judges whether or not the jth layer of the neural network is the input layer. The process returns to the step S2 when the judgment result in the step S11 is NO. On the other hand, the process ends when the judgment result in the step S11 is YES.

Figure 44:
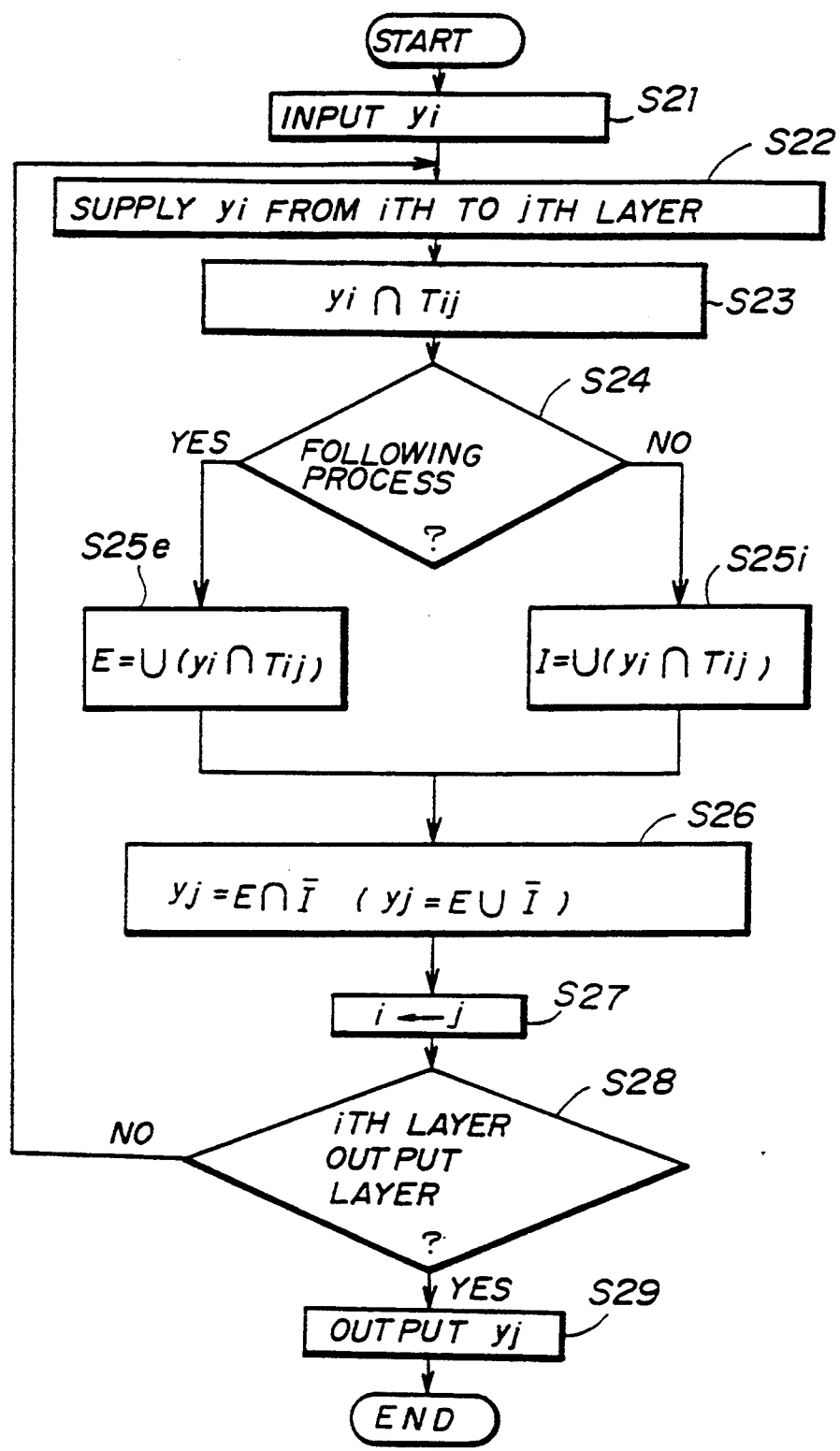
FIG. 44 is a flowchart of a forward process of the CPU shown in FIG. 42.

FIG. 44 is a flow chart for explaining the forward process of the CPU 302. In FIG. 44, a step S21 inputs the input signal (pulse train) $y_i$. A step S22 supplies a signal $y_i$ from the ith layer to the jth layer, where $j = i+1$. A step S23 obtains $y_i \cap T_{ij}$ which is an AND of the input signal $y_i$ and the weight function $T_{ij}$. A step S24 judges the following processes to be calculated depending on the sign of the weight function which is excitatory or inhibitory.

A step S25e is then carried out when the coupling is excitatory. On the other hand, a step S25i is carried out when the coupling is inhibitory. The step S25e obtains $E = \cup(T_{ij} \cap y_i)$ which is an OR of all $y_i \cap T_{ij}$ obtained in the step S23. The step S25i obtains $I = \cup(T_{ij} \cap y_i)$ which is an OR of all $y_i \cap T_{ij}$ obtained in the step S23.

A step S26 obtains $y_j = E \cap \overline{I}$ which is an AND of E and $\overline{I}$, or $y_j = E \cup \overline{I}$ which is an OR of E and $\overline{I}$. Then, a step S27 increments i by one. In this case, i is incremented to j. A step S28 judges whether or not the ith layer is the output layer of the neural network. When the judgment result in the step S28 is NO, the process returns to the step S22. On the other hand, when the judgment result in the step S28 is YES, a step S29 outputs the signal (pulse train) $y_j$ and the process ends.

Of course, the application of the present invention is not limited to the character recognition system. The present invention may be applied to various other systems such as image recognition systems, motion control systems for robots, and associative information storage systems.

In addition, the structure of the neural network according to the present invention is not limited to the network structure shown in FIG. 14.

Figure 45:
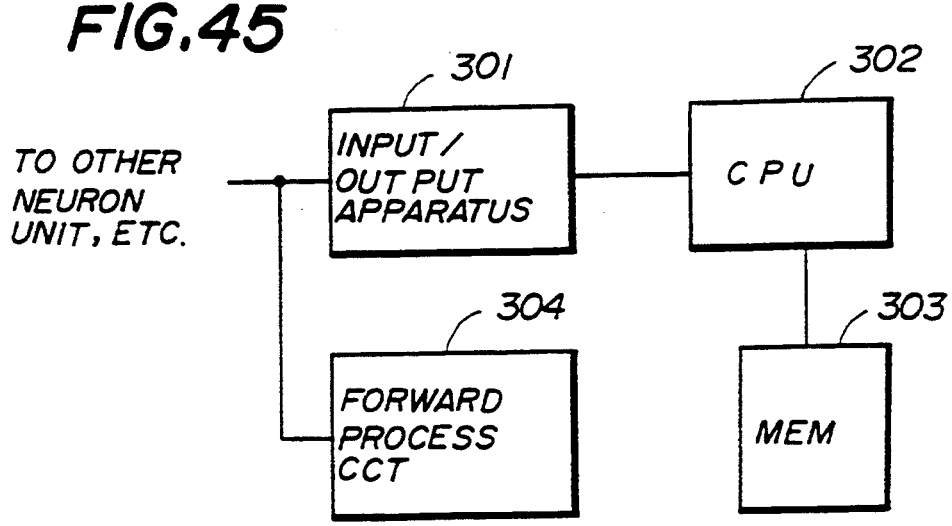
FIGS. 45 and 46 are block diagrams showing other computer systems which realize the neural networks by software.

In the aforementioned embodiments, a portion of the functions of one neuron unit is carried out by software. In other words, the forward process is carried out by software. In FIG. 45, software based on the signal processing procedure shown in FIG. 44 is stored in the memory 303, so as to realize a neuron unit which uses software and can carry out the forward process. In order to realize a neuron unit having the function of carrying out the forward process, the circuit shown in FIG. 32 or 39 is added to the input/output apparatus 301. In either case, the right half of the circuit shown in FIG. 33 and the circuit shown in FIG. 34 are required. The circuit shown in FIG. 38 may be provided depending on the needs. In FIG. 45, the forward process is realized by the provision of a forward process circuit 304.

According to this embodiment, the network structure can be modified by simply changing the memory 303 (or changing the contents of the memory 303) without the need to modify the hardware. As a result, the network structure becomes flexible and suited for general applications.

General electronic apparatuses usually have a CPU and there is no need to newly provide the CPU 302. In addition, when no learning function is required, it is possible to greatly reduce the necessary hardware.

Figure 46:
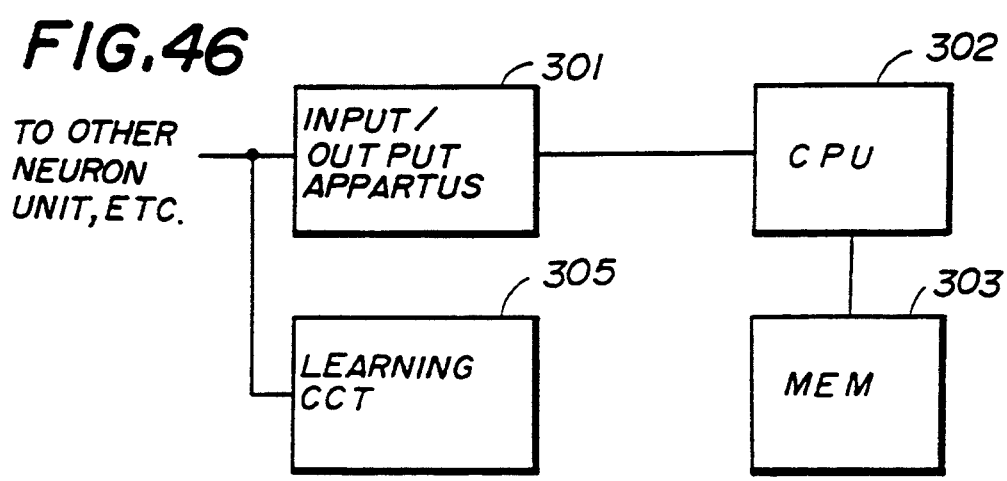

In the aforementioned embodiments, the learning process is carried out by software. In FIG. 46, software based on the signal processing procedure shown in FIG. 43 is stored in the memory 303, so as to realize a neuron unit which uses software and can carry out the learning process. In order to realize a neuron unit having the function of carrying out the learning process, the circuits shown in FIGS. 32 and 33, the circuits shown in FIGS. 32 and 40, the circuit shown in FIG. 35, 36 or 41 is added to, the input/output apparatus 301. The circuit shown in FIG. 37 may be provided depending on the needs. In FIG. 46, the learning function is realized by the provision of a learning circuit 305.

According to this embodiment, the network structure can be modified by simply changing the memory 303 (or changing the contents of the memory 303) without the need to modify the hardware. As a result, the network structure becomes flexible and suited for general applications. In addition, the network can cope with a modification to the learning rule. Furthermore, general electronic apparatuses usually have a CPU and there is no need to newly provide the CPU 302.

As described above, the functions of the neuron unit can be realize using software. Moreover, when the signal processing system of the present invention is employed, the signal processing can be made solely by digital logic operations, and a low level language may be used for the required software thereby enabling high-speed processing of the software.

Figure 47:
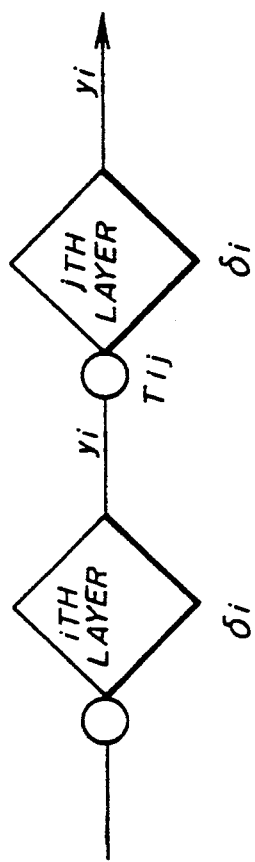
FIG. 47 is a diagram showing how signals are processed in accordance with the flowchart of FIG. 44.
Figure 48:
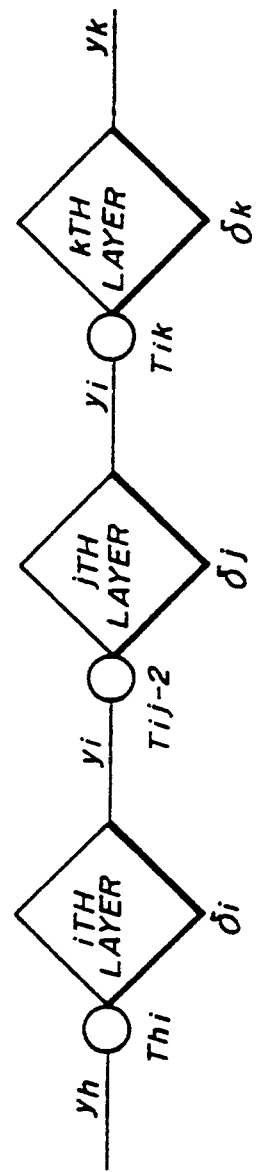
FIG. 48 is a diagram showing how signals are processed in accordance with the flowchart of FIG. 43.

FIG. 47 shows how the signals are processed by neuron units in accordance with the flowchart of FIG. 44, and FIG. 48 shows how the signals are processed by neuron units in accordance with the flowchart of FIG. 43.

FIG. 49 shows a neural network in which a neuron unit 1 included in an aggregate is not coupled to all neuron units 1 included in another aggregate. In the neural network shown in FIG. 14, each neuron unit 1 included in an aggregate is coupled to all neuron units 1 included in another aggregate. But in the present invention, the neuron units 1 included in an aggregate need not be coupled to all neuron units 1 included in another aggregate as may be seen from FIG. 49.

FIG. 50 shows a neural network in which a first aggregate and a last aggregate are coupled via two intermediate aggregates. Of course, the number of intermediate aggregates between the first and last aggregates is not limited to one or two and may be three or more.

In the foregoing, the various neuron units which forms a network have been described. It will be noted that an output signal of a certain neuron can be input to another neuron or itself. In any cases, the output signal of the neural network as shown in FIG. 14 is a pulse train. In the case where the pulse train is used as a control input, there are the following two methods for using the pulse train as a control input:

(1) The output pulse train from the neural network shown in FIG. 14 is used as it is; and
(2) The number of pulse contained in the output pulse train is counted and used.

In the case (1), the binary signal is directly input to the control object and serves as the control output signal Sy. The case (2) is further categorized into the following two methods:

(i) The counter value is directly used; and
(ii) The counter value is converted into a binary value by use of a threshold value.

In the case (i), the counter value may be directly input to the control object as the digital control output signal Sy. It is also possible to use, as the control output signal Sy, an analog signal corresponding to the counter value. In the case (ii), if the counter value is larger than the threshold value, a binary one is used. In other cases, a binary zero is used. It is also possible to use a binary zero if the counter value is larger than the threshold value. In this case, a binary one is used in other cases. As has been described previously, the motors driving the propellers can be driven by the binary signals by the pulse width modulation process.

The output signal of the neural network using the aforementioned pulse density type digital neuron units uses random numbers for signal processing. Thus, the output signal is based on possibility distributions. As a result, the PWM signal can be directly obtained from the output signal by using a suitable threshold value. There are two available threshold setting methods, one of which uses a fixed threshold value which is predetermined before controlling. The fixed threshold value may be set by a switch or may be stored in a memory. The other threshold setting method uses, as a threshold value, the number of pulse contained in the output signal from the neural network. For example, variable threshold value can be used by a manual method in which it is externally input by means of, for example, a switch. It is also possible to automatically vary the threshold value by performing an operation on the control input and output signals and the input and output signals of the neural network.

In order to efficiently make the neural network learn, it is desired that different pairs of the input signal and the teaching signals are successively input to the neural network. If a neural network for use in character recognition is made to learn numerals "1"–"9", a procedure is not desired such that the learning process of "1" is successively performed 10 times, and then the learning process of "2" is successively performed 10 times. It is preferable to repeatedly perform a cycle 10 times in such a way that the learning process of "1" is performed one time, and then the learning process of "2" is performed one time.

Figure 51:
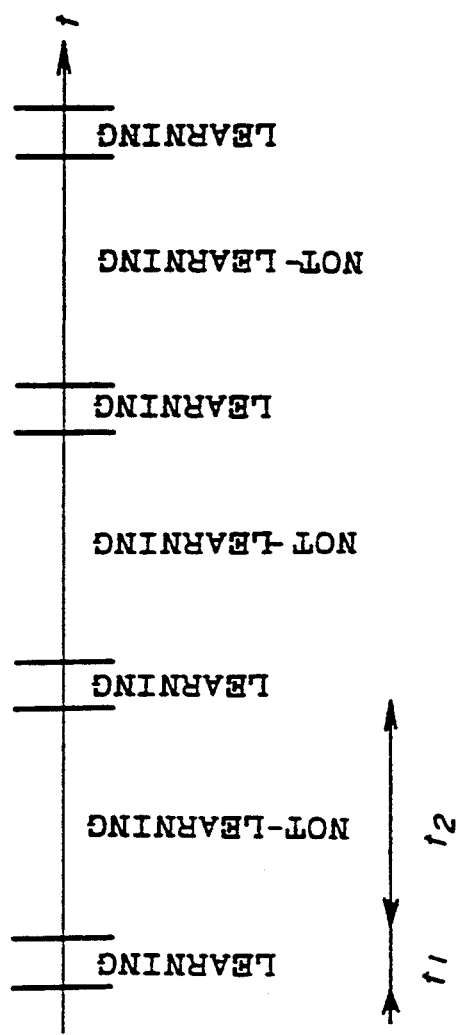
FIG. 51 is a timing chart showing how the learning process and forwarding process are carried out.

In the real-time learning process of the input signal which varies with time, if the speed of the input signal is smaller than that of the learning speed, the learning may not be efficiently carried out. In such cases, as shown in FIG. 51, the learning process is intermittently carried out. The learning process in which the weighting constant values are changed is carried out during time t1, and is not carried out during time t2 when the weighting constant values are fixed. It is easy to control the times t1 and t2 by using, for example, a timer.

The switching circuit 80 shown in FIG. 32 realizes the sequence shown in FIG. 51. The external switching signal Sa is applied to a terminal 91a. The switching circuit 80 selects, in response to the external switching signal Sa, either the output signal of the shift register 56 (the previous weighting constant values) or the output signal of the gate circuit 72 (newly obtained weighting constant values).

It is also possible to switch the network between the learning mode and the not-learning mode on the bases of the state of the input signal or the teaching signal. For example, in a system which changes slowly with time, it is determined whether or not the magnitude of change becomes greater than a predetermined magnitude of change. If the result of this determination is affirmative, the network is made to learn. It is possible to use a means for determining whether or not the teaching signal has an error. If the result of this determination is affirmative, the network is made learn.

The present invention is not limited to the specifically disclosed embodiments, and variations and modifications may be made without departing from the scope of the present invention.

What is claimed is:

1. A signal processing apparatus for controlling a controlled object having an output signal, comprising:
converting means for converting said output signal of the controlled object into a network input signal, said network input signal being a pulse density signal having a pulse density defined by a number of first values and second values within a predetermined time, the first values and the second values being arranged at random, and the first and second values respectively corresponding to high and low binary signal levels;
a neural network for receiving the network input signal and outputting a network output signal which is also a pulse density signal;
output means, coupled to said neural network, for converting said network output signal into a control output signal applied to the controlled object;

teaching means, coupled to said neural network, for generating a teaching signal for making the neural network learn in real-time;

switching means, coupled to said teaching means, for selectively allowing said teaching means to operate such that the neural network is selectively made to learn; and error signal generating means, coupled to said neural network and said teaching means, for generating an error signal using the teaching signal and information contained in said network output signal, said error signal controlling the neural network so that the control output signal has correct control information with respect to the output signal from the controlled object.

2. The signal processing apparatus as claimed in claim 1, wherein said switching means comprises means for periodically making said teaching means operate at predetermined intervals so that the neural network is periodically selectively made to learn.

3. The signal processing apparatus as claimed in claim 1, wherein said switching means comprises means for determining if at least one of the input signal and the teaching signal satisfies a predetermined condition, and for making said teaching means operate when the means for determining determines that at least one of the input signal and the teaching signal satisfies the predetermined condition.

4. A signal processing apparatus according to claim 1, wherein said switching means comprises:

means, connected to the neural network and the switching means, for cycling the neural network through a plurality of successive cycles, wherein each of said plurality of successive cycles includes a first period for learning in which said teaching means is made to operate by the switching means, followed by a second period for control by the neural network.

5. A signal processing apparatus for controlling a controlled object having an output signal, comprising:

converting means for converting said output signal of the controlled object into a network input signal, said network input signal being a pulse density signal having a pulse density defined by a number of first values and second values within a predetermined time, the first values and the second values being arranged at random, and the first and second values respectively corresponding to high and low binary signal levels;

a neural network receiving the network input signal and outputting a network output signal which is also a pulse density signal; and output means, coupled to said neural network, for converting said network output signal [Into]into a control output signal applied to the controlled object;

teaching means, coupled to said neural network, for generating a teaching signal for making the neural network learn in real-time; and error signal generating means, coupled to said neural network and said teaching means, for generating an error signal from a teaching signal and information contained in said network output signal, said error signal controlling the neural network so that the control output signal has correct control information with respect to the output signal from the controlled object.

6. The signal processing apparatus as claimed in claim 5, further comprising:

means, connected to the neural network and the output means, for counting pulse contained in the network output signal;

wherein said output means outputs said control output signal having information indicating a number of pulse counted.

7. The signal processing apparatus as claimed in claim 5, further comprising:

means, connected to the neural network, for counting pulses contained in the network output signal; and means, connected to the means for counting and output means, for comparing a number of pulse counted with a predetermined constant threshold value;

wherein said output means outputs said control output signal having information indicating a comparison result.

8. The signal processing apparatus as claimed in claim 5, further comprising:

means, connected to the neural network, for counting pulse contained in the network output signal; and means, connected to the means for counting and output means, for comparing a number of pulses counted with a predetermined threshold value externally supplied to the output means;

wherein said output means outputs said control output signal having information indicating a comparison result.

9. The signal processing apparatus as claimed in claim 5, further comprising:

means, connected to the neural network, for counting pulse contained in the network output signal; and means, connected to the means for counting and output means, for comparing a number of pulse counted with a variable threshold value;

wherein said output means outputs said control output signal having information indicating a comparison result.

* * * * *

UNITED STATES PATENT AND TRADEMARK OFFICE
CERTIFICATE OF CORRECTION

PATENT NO. : 5,349,646
DATED     : September 20, 1994
INVENTOR(S) : Toshiyuki FURUTA, et al.

It is certified that error appears in the above-indentified patent and that said Letters Patent is hereby corrected as shown below:

On the title page, Item [30], the second Foreign Application Priority Number is listed incorrectly. It should read:

--3-29342--

Signed and Sealed this

Seventh Day of February, 1995

Attest:

BRUCE LEHMAN

*Attesting Officer*         *Commissioner of Patents and Trademarks*